US011203230B2

(12) United States Patent
Zeltner et al.

(10) Patent No.: US 11,203,230 B2
(45) Date of Patent: Dec. 21, 2021

(54) CASTER WHEEL SUPPORT ASSEMBLY FOR A WHEELCHAIR AND WHEELCHAIR COMPRISING THE SAME

(71) Applicant: Invacare International GmbH, Witterswil (CH)

(72) Inventors: Michael Zeltner, Arlesheim (CH); Simon Brenner, Basel (CH); Martin Hunig, Reinach (CH)

(73) Assignee: INVACARE INTERNATIONAL GMBH, Witterswil (CH)

( * ) Notice: Subject to any disclaimer, the term of this patent is extended or adjusted under 35 U.S.C. 154(b) by 11 days.

(21) Appl. No.: 16/562,512

(22) Filed: Sep. 6, 2019

(65) Prior Publication Data

US 2020/0079153 A1 Mar. 12, 2020

(30) Foreign Application Priority Data

Sep. 6, 2018 (EP) .................................... 18192870

(51) Int. Cl.
*A61G 5/10* (2006.01)
*B60B 33/00* (2006.01)
*B60B 33/04* (2006.01)

(52) U.S. Cl.
CPC ............ *B60B 33/0005* (2013.01); *A61G 5/10* (2013.01); *B60B 33/0068* (2013.01); *B60B 33/04* (2013.01); *B60B 33/0049* (2013.01)

(58) Field of Classification Search
CPC .... A61G 5/10; A61G 5/1097; B60B 33/0005; B60B 33/0068; B60B 33/04; B60B 33/0049; B60B 33/0039; B60B 33/0023
See application file for complete search history.

(56) References Cited

U.S. PATENT DOCUMENTS 4,669,146 A * 6/1987 Saito ................... B60B 33/0002
16/18 A
5,060,962 A * 10/1991 McWethy ................ A61G 5/10
280/304.1
(Continued)

FOREIGN PATENT DOCUMENTS

DE 297 04 125 U1 7/1997
DE 298 17 702 U1 1/1999
(Continued)

OTHER PUBLICATIONS

European Search Report from European Application No. EP18192870 dated Mar. 11, 2019.

*Primary Examiner* — Frank B Vanaman
(74) *Attorney, Agent, or Firm* — Calfee, Halter & Griswold LLP

(57) ABSTRACT

The caster wheel support assembly has a first section securable to a frame member of a wheelchair and a second section holding a swivel member coupled to a caster wheel. The caster wheel support assembly has a holding member designed as a collet configured to hold a first portion of the swivel member which extends along a first axis. A second portion of the swivel member, which is coupled to the caster wheel, extends away from the first portion along a second axis which forms an angle relative to the first axis. The first portion of the swivel member is supported by the holding member to selectively allow rotation thereof relative to the holding member about the first axis, causing adjustment of a camber of the caster wheel. The collet is configured to selectively prevent or permit rotation of the swivel member relative to the holding member.

20 Claims, 20 Drawing Sheets

(56) References Cited

U.S. PATENT DOCUMENTS

| | | | |
|---|---|---|---|
| 5,294,142 A * | 3/1994 | Weege | A61G 5/10 280/304.1 |
| 5,360,224 A * | 11/1994 | Geiger | A61G 5/00 16/19 |
| 5,590,893 A * | 1/1997 | Robinson | A61G 5/00 280/250.1 |
| 7,353,566 B2 | 4/2008 | Scheiber et al. | |
| 7,377,713 B2 | 5/2008 | Schaap et al. | |
| 7,520,518 B2 | 4/2009 | Peterson et al. | |
| 9,358,164 B2 | 6/2016 | Brenner et al. | |
| 10,085,903 B1 * | 10/2018 | Ludovici | A61G 5/10 |
| 2005/0028319 A1 * | 2/2005 | Schreiber | B60B 33/0039 16/28 |
| 2009/0085321 A1 * | 4/2009 | Ludovici | A61G 5/10 280/250.1 |
| 2017/0296407 A1 | 10/2017 | Kuschall et al. | |
| 2020/0079153 A1 * | 3/2020 | Zeltner | B60B 33/0005 |

FOREIGN PATENT DOCUMENTS

| | | |
|---|---|---|
| EP | 1 454 764 A1 | 9/2004 |
| EP | 1 872 761 A1 | 1/2008 |
| JP | 2003-180758 A | 7/2003 |
| WO | 2003/104028 A2 | 12/2003 |
| WO | 2012/131642 A1 | 10/2012 |
| WO | 2013/093874 A1 | 6/2013 |
| WO | 2014/057306 A1 | 4/2014 |
| WO | 2016/042444 A1 | 3/2016 |

* cited by examiner

CASTER WHEEL SUPPORT ASSEMBLY FOR A WHEELCHAIR AND WHEELCHAIR COMPRISING THE SAME

RELATED APPLICATIONS

The present application claims the priority of European patent application No. 18192870.6 filed on Sep. 6, 2018, the entire disclosure of which is incorporated herein by reference.

TECHNICAL FIELD

The present invention generally relates to a caster wheel support assembly for a wheelchair and a wheelchair comprising the same.

BACKGROUND OF THE INVENTION

Caster wheel support assemblies are known as such in the art.

U.S. Pat. No. 7,353,566 B2 and corresponding International (PCT) Publication No. WO 03/104028 A2 for instance disclose such a wheel support assembly which provides for the ability to adjust an angle of a caster wheel forward or rearward in a driving direction (referred to herein as "caster angle"). This solution is also contemplated for use as a wheelchair's rear wheel support and provide for the ability to adjust a camber of the relevant rear wheel.

Further examples of caster wheel support assemblies which allow for adjustment of the caster angle are disclosed in European Patent Publications Nos. EP 1 454 764 A1 and EP 1 872 761 A1, International (PCT) Publication No. WO 2012/131642 A1, U.S. Pat. No. 7,520,518 B2 and German Utility Model No. DE 298 17 702 U1.

Yet another example of a known caster wheel support assembly is commercially available on the market as a component of the Champion® and Champion® SK wheelchairs sold by company Küschall AG (www.kuschall.com), an illustration of which is reproduced in FIGS. 1A to 1D hereof. Such a wheelchair and caster wheel support assembly are also disclosed in International (PCT) Publications Nos. WO 2013/093874 A1, WO 2014/057306 A1 and WO 2016/042444 A1, which publications are incorporated herein by reference.

FIG. 1A is a photographic illustration of Küschall's Champion® SK wheelchair, which is generally designated by reference numeral 1. This wheelchair 1 comprises a wheelchair frame 2 supporting a seat 5, a pair of rear wheels 3 allowing manual wheeling of the wheelchair 1, and a pair of front caster wheels 4 that are coupled to a front end of the wheelchair frame 2. More specifically, the wheelchair frame 2 comprises a pair of side frame members 20 provided on the left-hand and right-hand sides of the wheelchair 1, which side frame members 20 consist here of essentially L-shaped tubular frame members having a circular cross-section. A caster wheel support assembly 6 is secured to a front end of each frame member 20 to support the relevant front caster wheels 4 as shown in greater detail in FIGS. 1B to 1D. FIG. 1A further shows that the front end of the tubular frame members 20, above the location where the caster wheel support assemblies 6 are secured to the frame members 20, is configured to be foldable, a particularly advantageous feature of the Champion® SK wheelchair.

FIG. 1B is an enlarged view of the photographic illustration of FIG. 1A showing in greater detail one of the caster wheel support assemblies 6 (namely the one located on the right-hand side of the wheelchair 1) secured to the front end of the associated frame member 20. As illustrated, the caster wheel support assembly 6 comprises a support member 7 having a first section that is secured to the frame member 20 and a second section that is configured to hold a swivel member 8. This swivel member 8 is coupled to the relevant caster wheel 4 via a fork element 16 that is freely rotatable about the axis of the swivel member 8. Reference numeral 9.1 designates a first pair of bolts that are used to clamp the support member 7 on the relevant frame member 20, while reference numeral 9.2 designates a second pair of bolts that are used to secure the swivel member 8 to the support member 7.

Two parameters are to be taken into consideration when adjusting the caster wheels 4 with respect to the relevant frame members 20, namely the caster angle and camber angle (or simply camber). In essence, "caster angle" designates the angle formed by the caster wheel arrangement in the driving direction, while "camber (angle)" designates the angle formed by the caster wheel arrangement transversely to the driving direction. Ideally, caster angle and camber should be set to 0°, i.e. the axis of the swivel member 8 about which the fork element 16 is free to rotate should be vertical to ensure optimal behavior and performance.

FIGS. 1C and 1D schematically illustrate how caster angle and camber are adjusted with the known caster wheel support assembly 6 depicted in FIG. 1B.

Referring to FIG. 1C which illustrates adjustment of the caster angle, the wheelchair 1 is first placed on a planar surface and the caster wheel 4 is turned transversely to the driving direction (NB: by convention, it will be assumed in the following that the driving direction is a direction that coincides with the x-axis of a Cartesian coordinate system x-y-z as reproduced in the drawings). A 90° ruler (such as a triangular ruler) is then placed next to the side of the caster wheel 4, as schematically shown in FIG. 1C, to check if the caster wheel 4 is perfectly vertical. If a gap exists between the caster wheel 4 and the ruler (as indicated by reference A in FIG. 1C), which is indicative of the fact that adjustment of the caster angle is required, the bolts 9.2 are loosened to allow the swivel member 8 to be adjusted with respect to the support member 7 (as indicated by the double arrow in FIG. 1C). Adjustment of the position of the swivel member 8 relative to the support member 7 is carried out manually to ensure that the caster wheel 4 is perfectly vertical and the gap with the ruler is eliminated, thereby correcting the caster angle accordingly. Once the adjustment is made, the bolts 9.2 are tightened again to secure the swivel member 8 onto the support member 7.

Referring to FIG. 1D which illustrates adjustment of the camber of the caster wheel 4, the wheelchair 1 is likewise first placed on a planar surface and the caster wheel 4 is turned in this case so as to be aligned with the driving direction. A 90° ruler is then placed next to the side of the caster wheel 4, as schematically shown in FIG. 1D, to similarly check if the caster wheel 4 is perfectly vertical. If a gap exists between the caster wheel 4 and the ruler (as indicated once again by reference A in FIG. 1D), which is indicative of the fact that adjustment of the camber is required, the bolts 9.1 are loosened in this case to allow the support member 7 to be adjusted (i.e. turned) with respect to the frame member 20 (as indicated by the double arrow in FIG. 1D). Adjustment of the position of the support member 7 relative to the frame member 20 is carried out manually to ensure that the caster wheel 4 is perfectly vertical and the gap with the ruler is eliminated, thereby correcting the camber accordingly. Once the adjustment is made, the bolts 9.1 are tightened again to clamp the support member 7 onto the frame member 20.

A drawback with the aforementioned approach resides in that adjustment of the camber requires loosening of the bolts 9.1 and movement of the entire support member 7 relative to the frame member 20, which may compromise vertical adjustment of the caster wheel support assembly 6 along the frame member 20, and vice versa. This adjustment may furthermore lead to undesired damage to the support member 7 and/or frame member 20 as a result of friction or dirt finding its way between the two components. The cross-section of the relevant portion of the frame member 20, where the caster wheel support assembly 6 is secured, is furthermore necessarily circular to allow the support member 7 to be turned relative to the frame member 20 during adjustment, as mentioned above in connection with FIG. 1D, which also leads to potential adjustment inaccuracies.

Japanese Patent Publication No. JP 2003-180758 A discloses a caster wheel support assembly configured to allow adjustment of the caster wheel along three different directions, including along a direction allowing adjustment of a camber of the caster wheel.

There is therefore a need for an improved solution which facilitates adjustment of the caster wheel(s) of a wheelchair, especially adjustment of the camber of the caster wheel(s).

SUMMARY OF THE INVENTION

A general aim of the invention is to provide such a caster wheel support assembly that is easy to adjust on a wheelchair.

Yet another aim of the invention is to provide such a caster wheel support assembly that allows for a camber of the caster wheel to be adjusted if need be and in a simple manner.

A further aim of the invention is to provide such a caster wheel support assembly which is of simple construction, is robust and cost-efficient to produce.

Still another aim of the invention is to provide such a caster wheel support assembly which can be adjusted without causing undesired damage to the wheelchair frame onto which the caster wheel support assembly is secured.

These aims are achieved thanks to the solutions defined in the claims.

In accordance with the invention, there is provided a caster wheel support assembly for a wheelchair as defined in claim 1, namely a caster wheel support assembly having a first section configured to be securable to a frame member of the wheelchair and a second section configured to hold a swivel member coupled to a caster wheel. According to the invention, the caster wheel support assembly comprises a holding member designed as a collet configured to hold a first portion of the swivel member, which first portion extends along a first axis. A second portion of the swivel member, which is coupled to the caster wheel, extends away from the first portion along a second axis, which second axis forms an angle relative to the first axis. The holding member and swivel member are configured such that the first portion of the swivel member is supported by the holding member to selectively allow rotation of the swivel member relative to the holding member about the first axis and thereby cause adjustment of a camber of the caster wheel.

The collet is configured to selectively allow: clamping of the swivel member onto the holding member, thereby preventing rotation of the swivel member relative to the holding member; and release of the swivel member with respect to the holding member, thereby permitting rotation of the swivel member relative to the holding member.

In this context, the holding member may advantageously comprise a longitudinal opening gap formed along an axial length of the holding member, which longitudinal opening gap is designed to selectively allow clamping or release of the swivel member with respect to the holding member.

In accordance with a preferred embodiment of the invention, the first portion of the swivel member comprises a head portion that is designed to allow manual rotation of the swivel member about the first axis by means of a tool.

Preferably, the camber of the caster wheel is adjustable in a continuous, stepless manner as a result of rotation of the swivel member about the first axis.

According to an advantageous embodiment of the invention, the angle formed between the first and second axes does not exceed 5°, and is preferably of the order of 2°.

By way of preference, the holding member comprises a guiding aperture extending along the first axis and inside which the first portion of the swivel member is supported. In this context, the first and second portions of the swivel member may in particular be substantially cylindrical portions coaxial to the first and second axes, respectively, and the first portion of the swivel member may advantageously exhibit a grooved section designed to retain the swivel member inside the guiding aperture, the caster wheel support assembly further comprising a retaining element secured to the holding member, which retaining element cooperates with the grooved section on the first portion of the swivel member. Moreover, this retaining element can also advantageously act as clamping element to selectively clamp the swivel member onto the holding member and prevent rotation of the swivel member relative to the holding member.

According to yet another embodiment of the invention, the caster wheel support assembly may be configured to allow adjustment of an angle of inclination of the swivel member forward or rearward in a driving direction.

In accordance with an advantageous variant of the invention, the caster wheel support assembly may further comprise a support member with first and second sections acting respectively as the first and second sections of the caster wheel support assembly, the holding member being secured to the second section of the support member. In this context, the first section of the support member preferably comprises first and second arms each configured to be securable to the frame member.

In accordance with another variant of the invention, the holding member itself is configured to be securable directly to the frame member.

Also claimed is a wheelchair comprising at least one caster wheel support assembly in accordance with the invention, which caster wheel support assembly is secured to a frame member of the wheelchair.

In accordance with a particularly preferred embodiment of the aforementioned wheelchair, the caster wheel support assembly is a caster wheel support assembly comprising the aforementioned support member, and the frame member exhibits a non-circular cross-section where the caster wheel support assembly is secured to the frame member, the first section of the support member being provided with at least one mounting aperture the shape of which substantially matches the non-circular cross-section of the frame member, preventing any rotation of the support member with respect to the frame member. In this context, the frame member and the support member of the caster wheel support assembly may further be configured such that the support member is slidably adjustable along the frame member.

Furthermore, the frame member may advantageously be a hydroformed part, preferably made of aluminum.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the embodiments disclosed herein.

As described herein, when two or more parts or components are described as being connected, secured or coupled to one another, they can be so connected, secured or coupled directly to each other or through one or more intermediary parts.

The invention will be described in relation to various embodiments of a caster wheel support assembly for attachment to a front end of a wheelchair frame, in a manner similar to the known caster wheel support assembly depicted in FIGS. 1A to 1D. As a matter of fact, the caster wheel support assembly of the invention is retrofittable on existing wheelchairs, including but not limited to the wheelchair 1 depicted in FIG. 1A. It is worth pointing out that the invention is generally applicable to any wheelchair comprising at least one caster wheel support assembly, be it at a front end and/or rear end of the wheelchair.

Figure 1A:
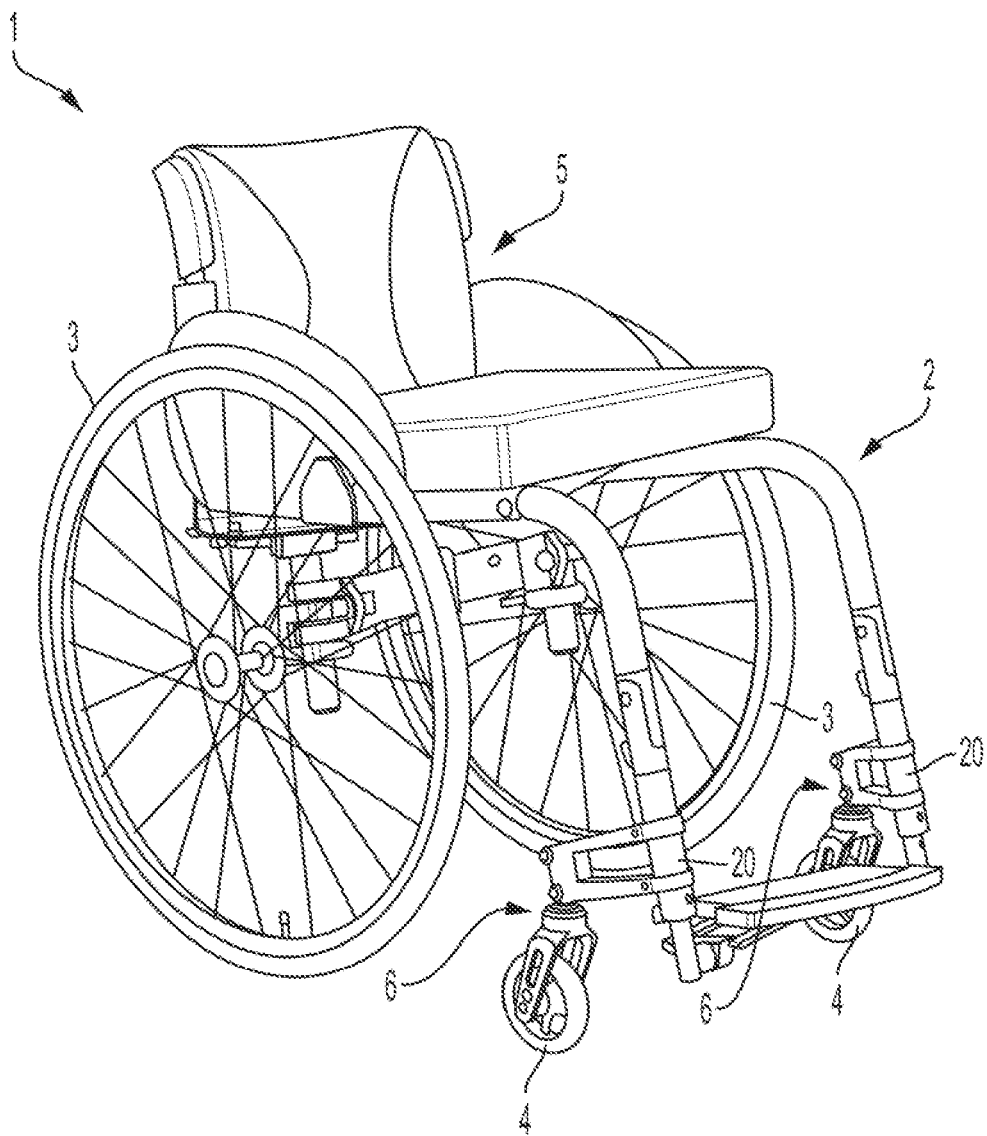
FIG. 1A is a photographic illustration of a known commercially-available wheelchair, namely the Champion® SK wheelchair as sold by company Küschall AG.
Figure 1B:
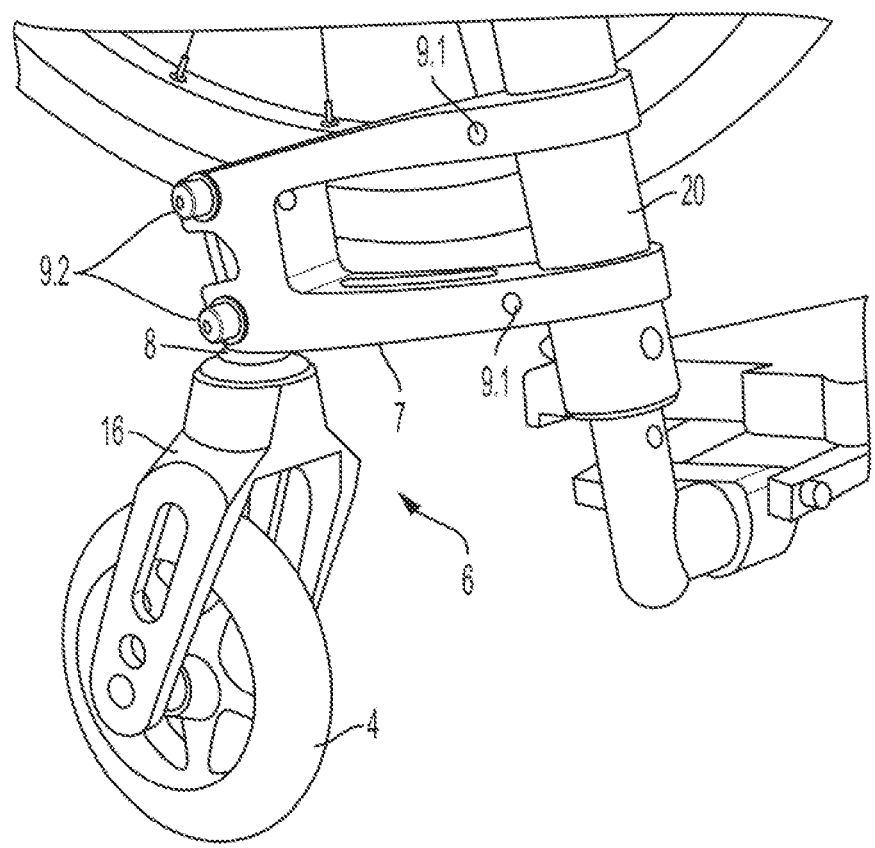
FIG. 1B is an enlarged view of the photographic illustration of FIG. 1A showing a known caster wheel support assembly secured on a frame member at a front end of the wheelchair frame.
Figure 1C:
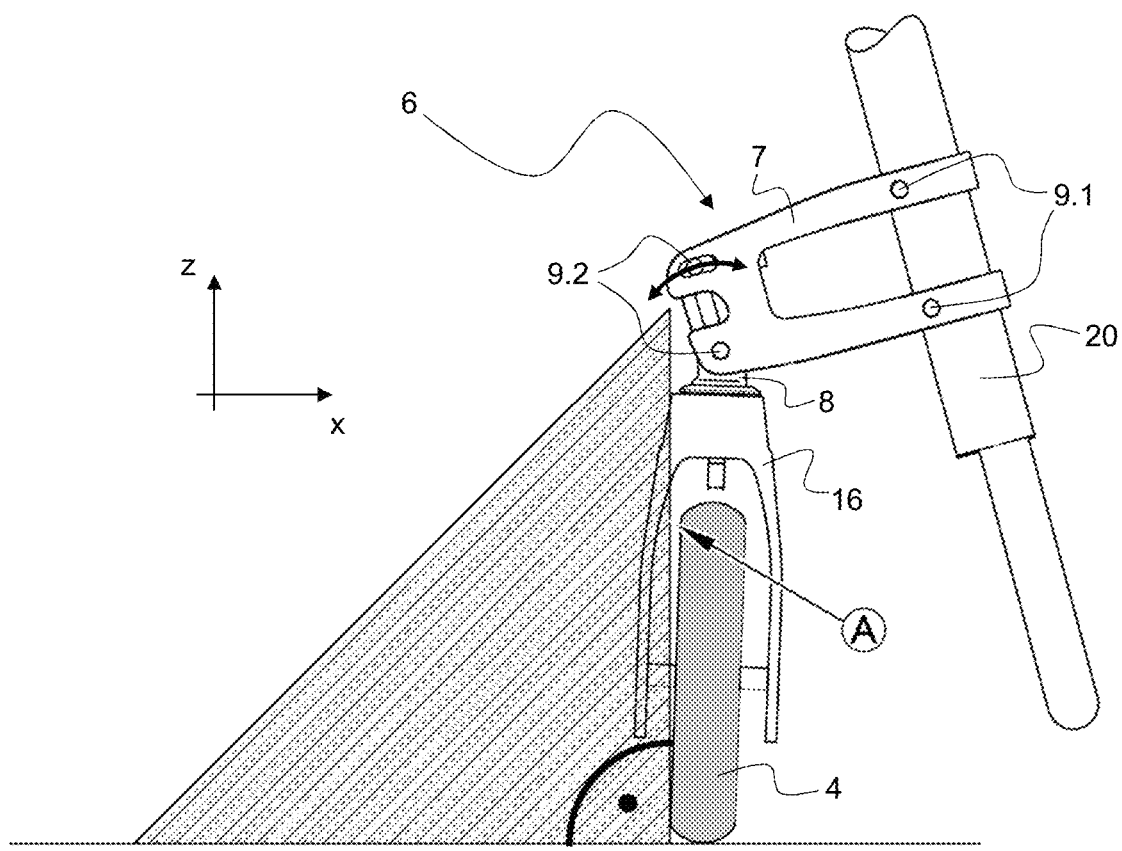
FIG. 1C is a schematic drawing of the known caster wheel support assembly of FIG. 1B, mounted on the relevant frame member, as seen from the side, and illustrating adjustment of the angle of the caster wheel relative to a driving direction (or "caster angle")
Figure 1D:
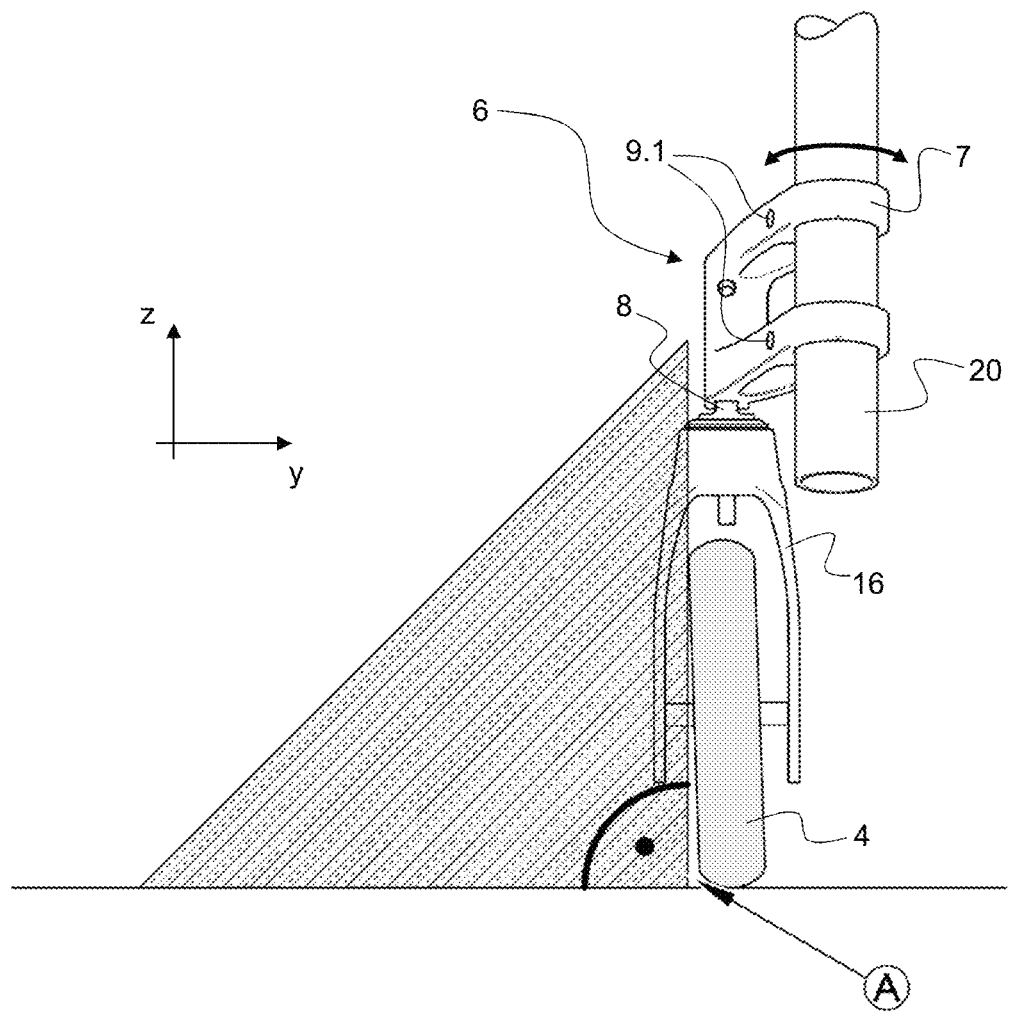
FIG. 1D is a schematic drawing of the known caster wheel support assembly of FIG. 1B, mounted on the relevant frame member, as seen from the front, and illustrating adjustment of the camber of the caster wheel relative to the driving direction (also referred to as "drift angle")
Figure 2A:
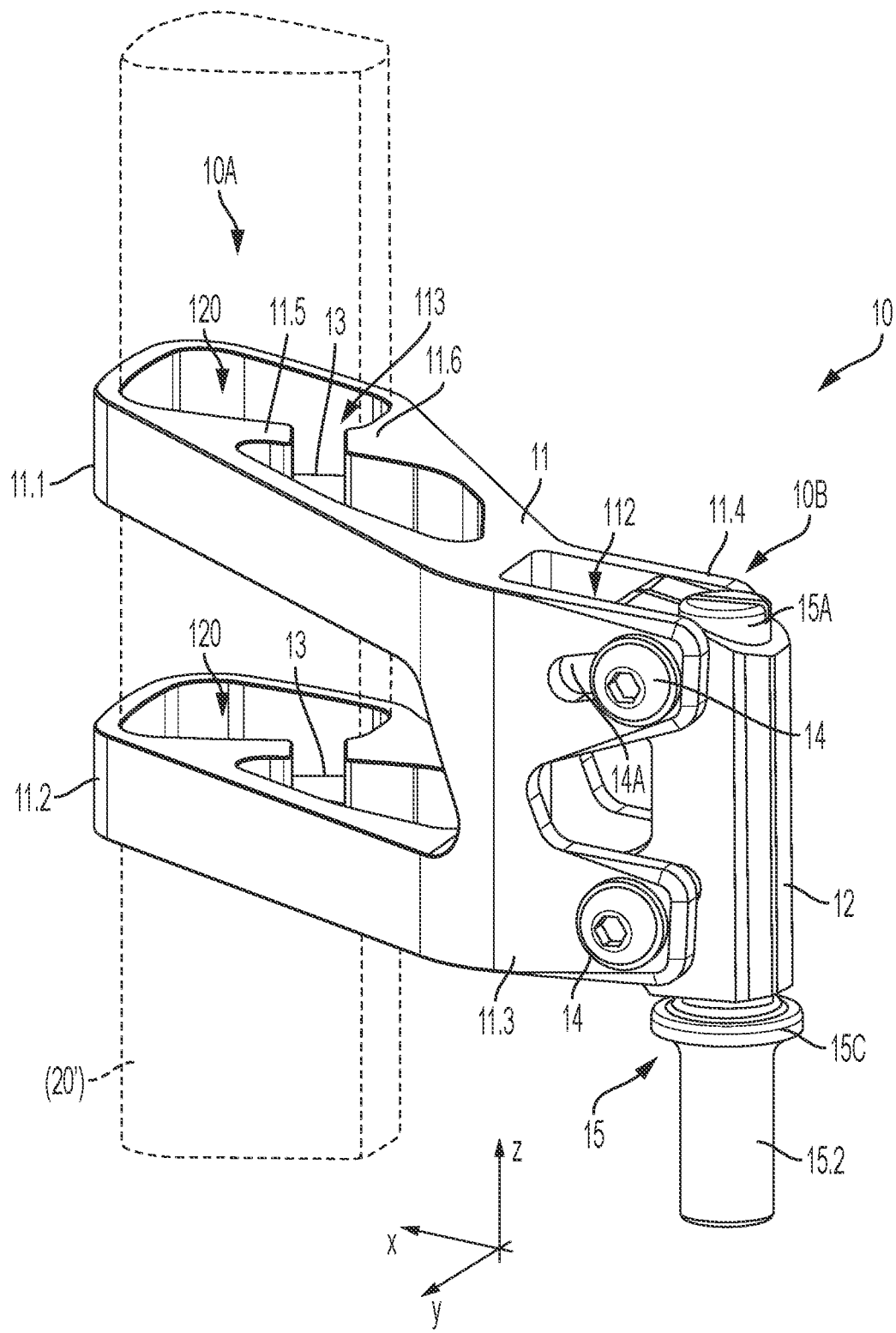
FIG. 2A is a perspective view of a caster wheel support assembly in accordance with a first embodiment of the present invention.
Figure 6:
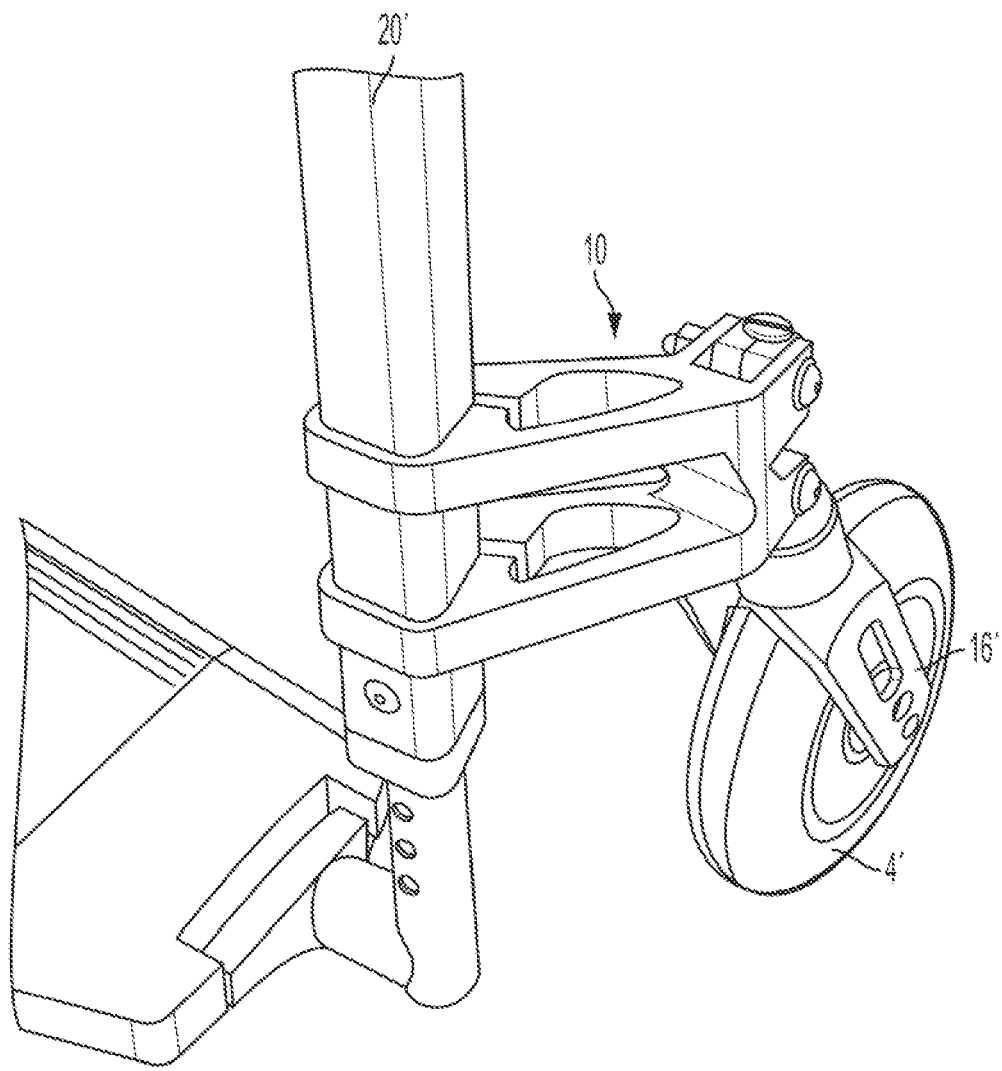
FIG. 6 is a photographic illustration of the caster wheel support assembly of FIG. 2A as secured on a relevant portion of a frame member of a wheelchair.

FIG. 2A is a perspective view of a caster wheel support assembly in accordance with a first embodiment of the present invention, which caster wheel support assembly is generally designated by reference numeral 10. The caster wheel support assembly 10 generally has a first section 10A that is configured to be securable to a frame member of a wheelchair and a second section 10B that is configured to hold a swivel member 15 coupled to a caster wheel (not shown in FIG. 2A). Such a caster wheel, designated by reference numeral 4', is depicted in the photographic illustration of FIG. 6 and can in particular be coupled to the swivel member 15 by means of a fork element 16', in a manner similar to the known caster wheel support assembly 6 of FIGS. 1A to 1D.

A portion of a frame member, designated by reference numeral 20', secured to the first section 10A of the caster wheel support assembly 10, is schematically depicted in dashed lines in FIG. 2A for the sake of illustration and explanation. In the present instance, the caster wheel support assembly 10 is illustrated in a configuration suitable for mounting on the left-hand side of a wheelchair frame (see also FIG. 6). It is to be understood that a similar caster wheel support assembly 10 exhibiting a mirrored configuration would be mounted on the right-hand side of the wheelchair frame. The overall shape and configuration of the caster wheel support assembly 10 as depicted in FIG. 2A is not however limitative and may vary depending on the application and/or on design considerations.

A Cartesian coordinate system x-y-z is also reproduced in FIG. 2A for the sake of identifying the relevant orientation in which the caster wheel support assembly 10 is mounted. As already mentioned above, it will be assumed that the x-axis coincides with the relevant driving direction and that the y-axis designates a lateral direction, transversely to the driving direction, while the z-axis designates a direction perpendicular to the plane formed by the x-axis and y-axis.

In a manner similar to the known caster wheel support assembly 6 depicted in FIGS. 1A to 1D, the caster wheel support assembly 10 according to this first embodiment of the invention comprises a support member 11 having a first section acting as the aforementioned first section 10A of the caster wheel support assembly 10, which first section is accordingly configured to be securable to the frame member 20'. The support member 11 further has a second section acting as the aforementioned second section 10B of the caster wheel support assembly 10, which second section is configured to hold the swivel member 15.

Figure 2B:
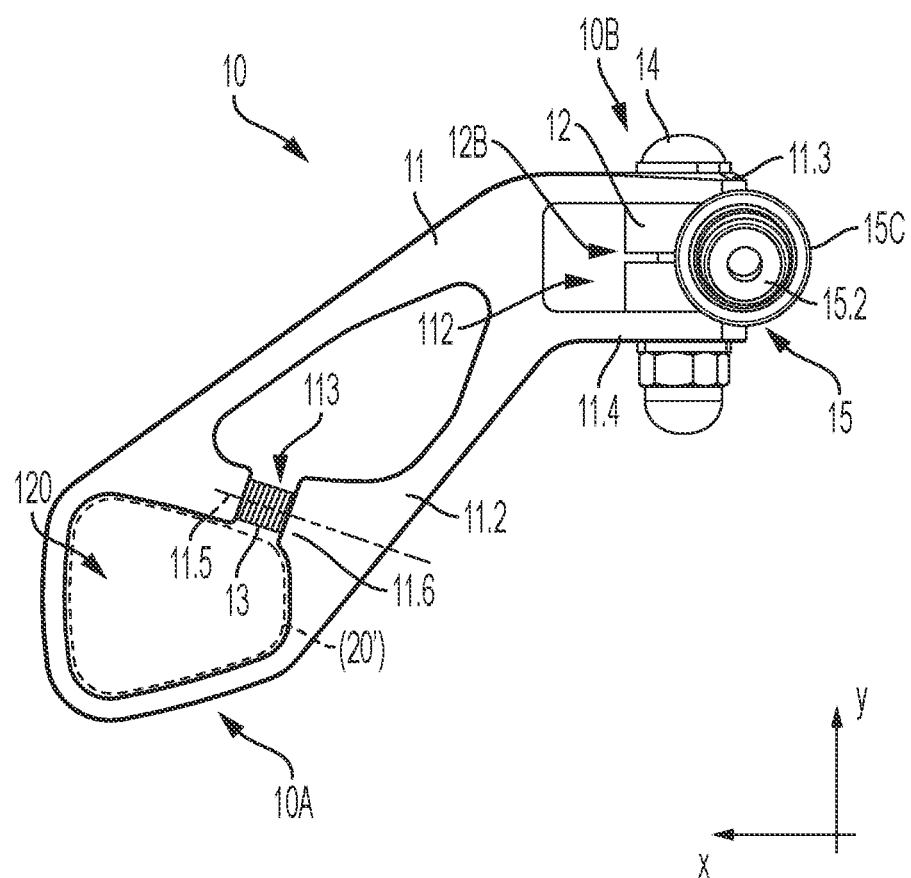
FIG. 2B is a bottom view of the caster wheel support assembly of FIG. 2A.

The first section of the support member 11 may in particular comprise first and second arms 11.1, 11.2 each configured to be securable to the relevant frame member 20', each arm 11.1, 11.2 being provided with a corresponding mounting aperture 120, the shape of which substantially matches the cross-section of the frame member 20'. In the present instance, it may be appreciated that the cross-section of the frame member 20' is advantageously non-circular (see also FIGS. 2B to 2D).

The configuration of the caster wheel support assembly 10 and relevant components thereof are further illustrated in FIGS. 2B to 2D, 3 and 4. More precisely, the swivel member 15 is configured to exhibit first and second portions designated by reference numerals 15.1 and 15.2, respectively, which first and second portions 15.1, 15.2 extend along respective axes designated by references A1 and A2 respectively. The second portion 15.2 of the swivel member 15 is designed to be coupled to the relevant caster wheel 4', while the first portion 15.1 of the swivel member 15 is held by a holding member 12 that is secured to the second section of the support member 11. A shoulder portion 15C is furthermore preferably formed between the first and second portions 15.1, 15.2 to provide support against which the relevant upper portion of the fork element 16' can come in abutment.

Figure 2D:
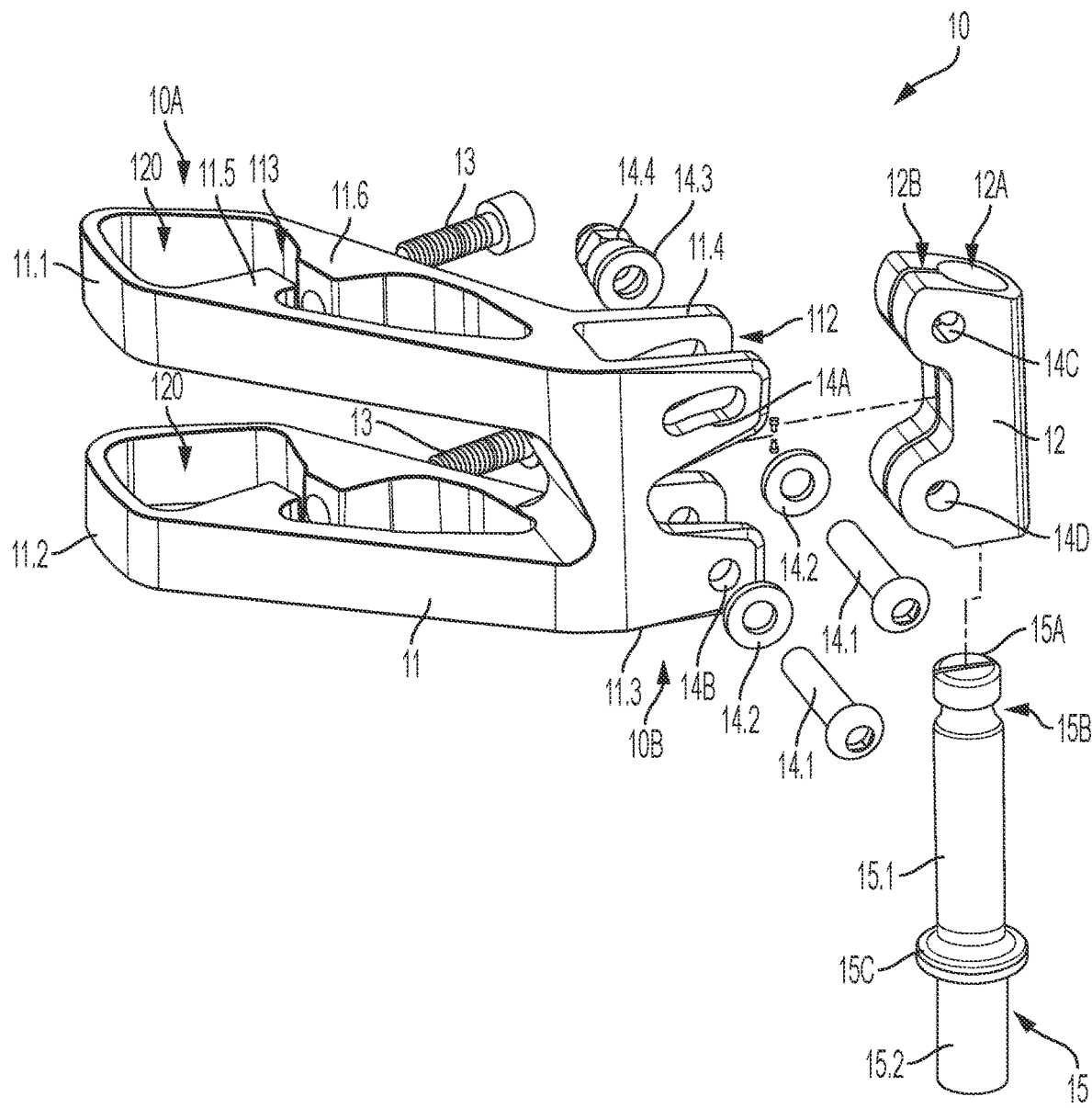
FIG. 2D is an exploded perspective view of the caster wheel support assembly of FIG. 2A.
Figure 3:
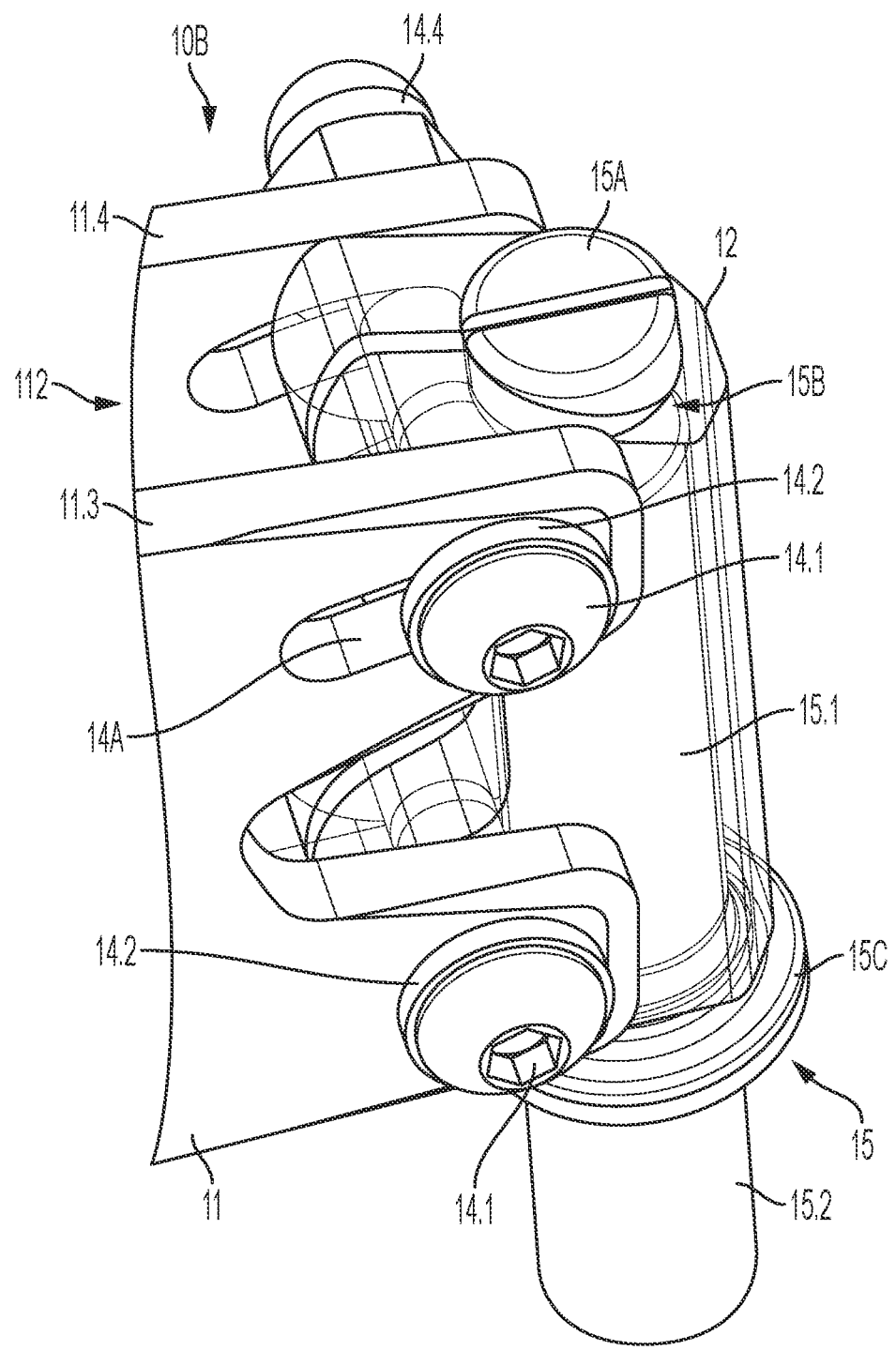
FIG. 3 is a partial perspective view of the caster wheel support assembly of FIG. 2A as seen from above.

In the illustrated embodiment, the holding member 12 preferably comprises a substantially cylindrical guiding aperture 12A extending along the first axis A1 and inside which the first portion 15.1 of the swivel member 15 is supported. As illustrated, the first and second portions 15.1, 15.2 of the swivel member 15 are preferably substantially cylindrical portions coaxial to the first and second axes A1, A2, respectively. Furthermore, in the illustrated example, the first portion 15.1 further exhibits a grooved section 15B designed to retain the swivel member 15 inside the guiding aperture 12A (see FIGS. 2D, 3 and 4). In FIG. 3, the holding member 12 is depicted in transparency to reveal the first portion 15.1 of the swivel member 15 held therein.

The holding member 12 is preferably secured to the second section of the support member 11 by means of an adjustable retaining mechanism 11.3/11.4/14, which will be described in greater detail hereafter. In the illustrated example, the second section of the support member 11 advantageously exhibits first and second extensions 11.3, 11.4 forming an opening gap 112 between them, which opening gap 112 is dimensioned to receive the holding member 12. In the illustrated example, the holding member 12 is held and secured to the second section of the support member 11 by means of a pair of (upper and lower) retaining elements 14 that are provided in upper and lower portions of the extensions 11.3, 11.4, each provided with corresponding retaining apertures 14A, 14B. Corresponding retaining apertures 14C, 14D are likewise formed on the holding member 12 for cooperation with the upper and lower retaining elements 14.

In the illustrated example, retaining elements 14 each include a bolt 14.1, a pair of washers 14.2, 14.3 and a nut 14.4 (see FIG. 2D), the holding member 12 being selectively clampable between the extensions 11.3, 11.4 by tightening the retaining elements 14. Conversely, tension can be released by loosening the retaining elements 14. In the illustrated embodiment, retaining elements 14 advantageously fulfill two purposes, namely (i) securing the holding member 12 to the second section of the support member 11 and selectively allowing adjustment of the position of the holding member 12 with respect to the support member 11 to be carried out if need be (leading to a corresponding adjustment of the caster angle in the driving direction as discussed below) and (ii) clamping the swivel member 15 onto the holding member 12 and selectively allowing adjustment of the rotational position of the swivel member 15 with respect to the holding member 12 to be carried out if need be (leading to a corresponding adjustment of the camber of the caster wheel 4 as discussed below).

It will further be appreciated that, in the illustrated embodiment, the upper retaining element 14 fulfills yet another purpose, namely to interact with the aforementioned grooved section 15B on the first portion 15.1 of the swivel member 15 to retain the swivel member 15 inside the guiding aperture 12A.

Figure 2C:
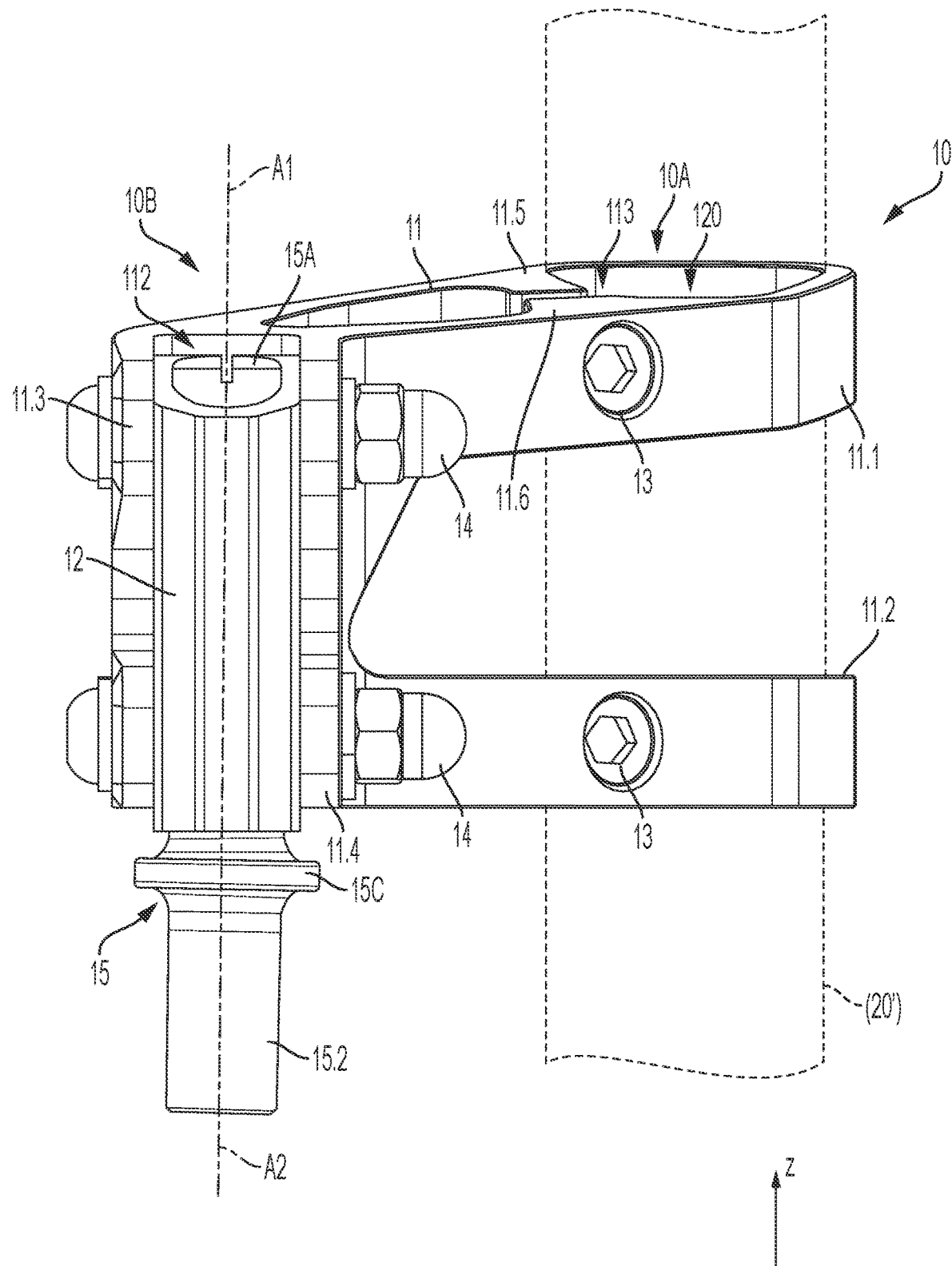
FIG. 2C is a rear view of the caster wheel support assembly of FIG. 2A.
Figure 4:
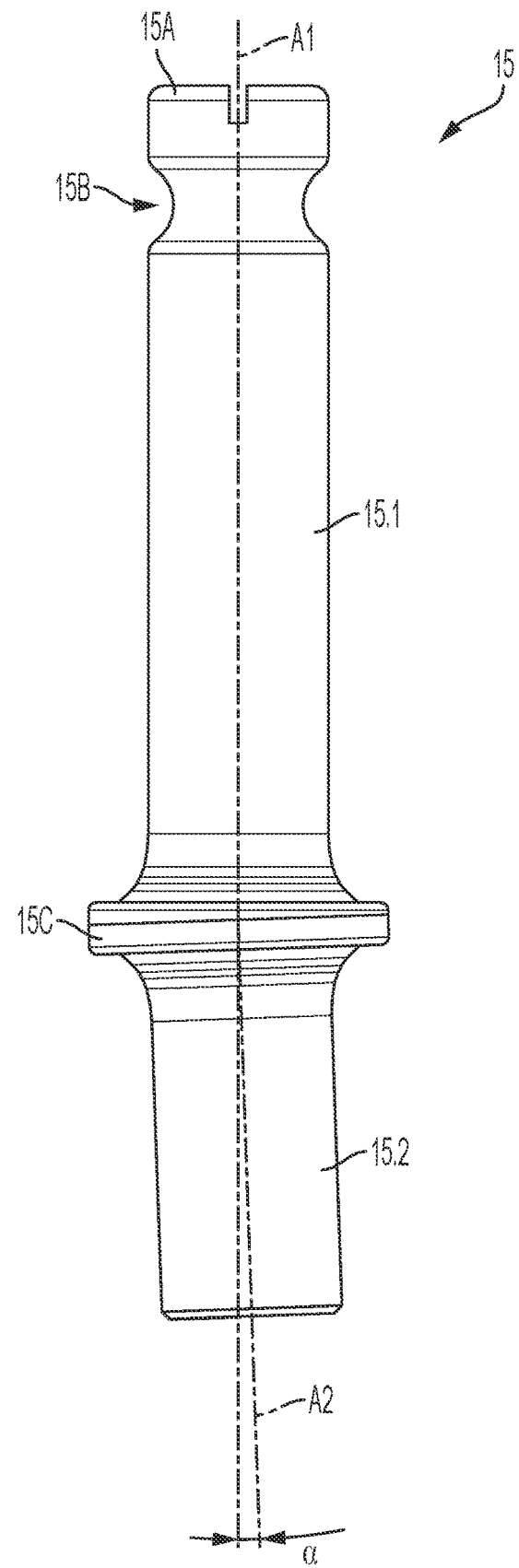
FIG. 4 is a side view of a swivel member of the caster wheel support assembly of FIG. 2A.

As this is more clearly apparent from looking at the illustrations of FIGS. 2C and 4, the second portion 15.2 of the swivel member 15 extends away from the first portion 15.1 along the second axis A2, which second axis A2 forms an angle α relative to the first axis A1. By way of preference, this angle α does not exceed 5°, and is preferably of the order of 2°.

According to the invention, the holding member 12 and swivel member 15 are configured such that the first portion 15.1 of the swivel member 15 is supported by the holding member 12 to selectively allow rotation of the swivel member 15 relative to the holding member 12 about the first axis A1. Thanks to the particular configuration of the swivel member 15, rotation of the swivel member 15 about the first axis A1 will cause the second portion 15.2 to rotate along a conical trajectory coaxial with the first axis A1. This movement is exploited to carry out adjustment of the camber of the caster wheel 4' that is coupled to the second portion 15.2 of the swivel member 15.

In accordance with the invention, as depicted e.g. in FIGS. 2A to 2D, 3 and 4, the holding member 12 is designed as a collet configured to selectively allow: (i) clamping of the swivel member 15 onto the holding member 12, thereby preventing rotation of the swivel member 15 relative to the holding member 12; and (ii) release of the swivel member 15 with respect to the holding member 12, thereby permitting rotation of the swivel member 15 relative to the holding member 12.

It will therefore be understood that the swivel member 15 is released to permit rotation of the swivel member 15 relative to the holding member 12 when adjustment of the camber of the associated caster wheel 4 is required. Once adjustment of the camber has been carried out, the swivel member 15 is clamped onto the holding member 12 to prevent any undesired rotation of the swivel member 15 relative to the holding member 12 under normal operating conditions.

Clamping of the swivel member 15 onto the holding member 12 can be achieved in various ways. By way of preference, the holding member 12 comprises a longitudinal opening gap 12B formed along an axial length of the holding member 12 (see e.g. FIGS. 2B and 2D), which longitudinal opening gap 12B is designed to selectively allow clamping or release of the swivel member 15 with respect to the holding member 12. In the illustrated example, clamping of the swivel member 15 onto the holding member 12 is achieved thanks to the aforementioned retaining mechanism 11.3/11.4/14, which also acts as clamping mechanism. More precisely, the retaining elements 14 not only act as retaining elements in this example, but also as clamping elements to selectively clamp the swivel member 15 onto the holding member 12.

Under normal operating conditions, the swivel member 15 is prevented from being able to rotate with respect to the holding member 12 by clamping using the retaining elements 14. Loosening the retaining elements 14 allows for the swivel member 15 to be selectively turned about the first axis A1 to carry out adjustments of the camber. In order to facilitate such adjustments, the first portion 15.1 of the swivel member 15 preferably comprises a head portion 15A that is designed to allow manual rotation of the swivel member 15 about the first axis A1 by means of a tool, such as a screwdriver. In the illustrated embodiment, the head portion 15A is accessible from an upper portion of the caster wheel support assembly 10 (see e.g. FIGS. 2A, 2C and 3).

By way of preference, the camber of the caster wheel is adjustable in a continuous, stepless manner as a result of rotation of the swivel member 15 about the first axis A1, which is achieved, in the illustrated embodiment, thanks to the overall configuration of the swivel member 15 and holding member 12, which allows for the swivel member 15 to be turned to any desired angular position.

In the context of the aforementioned first embodiment, the caster wheel support assembly 10 is secured, at the first section 10A, to the relevant frame member 20' by means of the support member 11. To this end, the corresponding first section of the support member 11 is advantageously provided with a clamping mechanism 11.5/11.6/13. More precisely, each end of the first and second arms 11.1, 11.2 that is secured to the frame member 20' is designed as a clamping collar comprising first and second extensions 11.5, 11.6 separated by an opening gap 113 and a clamping element 13 (such as a bolt) that cooperates with both extensions 11.5, 11.6 to selectively allow tightening or loosening of the resulting clamping collar. The resulting mounting aperture 120 can accordingly be tightened or loosened around the relevant portion of the frame member 20'.

As mentioned above, the frame member 20' advantageously exhibits a non-circular cross-section where the caster wheel support assembly 10 is secured to the frame member 20', and each mounting aperture 120 exhibits a shape that substantially matches the non-circular cross-section of the frame member 20', thereby preventing any rotation of the support member 11 with respect to the frame member 20'. Moreover, according to this first embodiment of the invention, the frame member 20' and the support member 11 are configured such that the support member 11 is slidably adjustable along the frame member 20', namely by loosening the clamping elements 13, moving the support member 11 up or down along the frame member 20', and then tightening again the clamping elements 13 to secure the caster wheel support assembly 10 onto the desired portion of the frame member 20'. One will appreciate that this adjustment does not in any way affect or compromise the adjustment of the camber or caster angle of the caster wheel arrangement.

By way of preference, the frame member 20' is a hydroformed part, in particular a hydroformed part made of aluminum. Hydroforming is particularly advantageous in that this technique allows to shape the relevant frame member 20' to exhibit the desired non-circular cross-section.

Figure 5A:
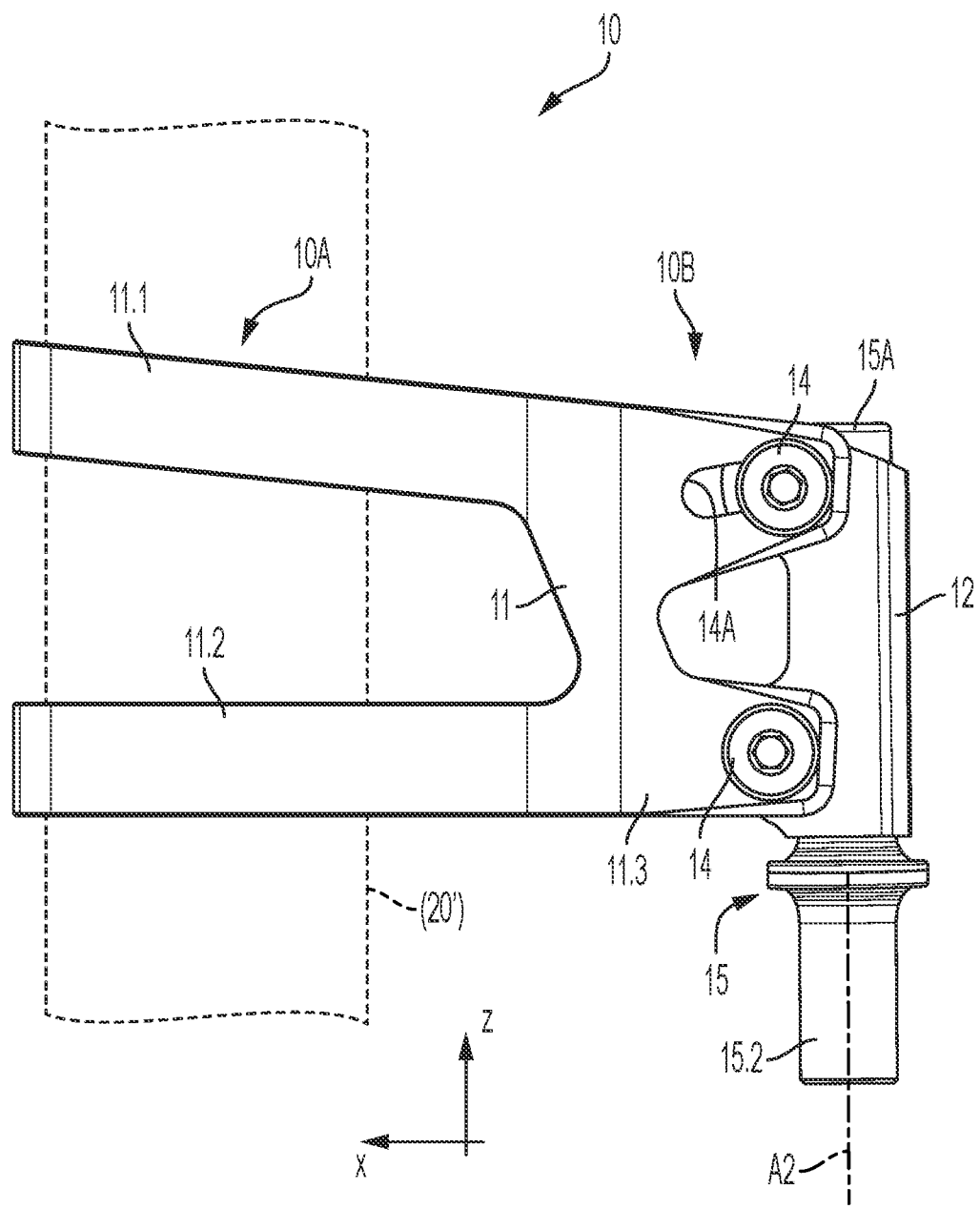
FIG. 5A is a side view of the caster wheel support assembly of FIG. 2A showing the swivel member in a first configuration with respect to the frame member onto which the caster wheel support assembly is mounted.
Figure 5B:
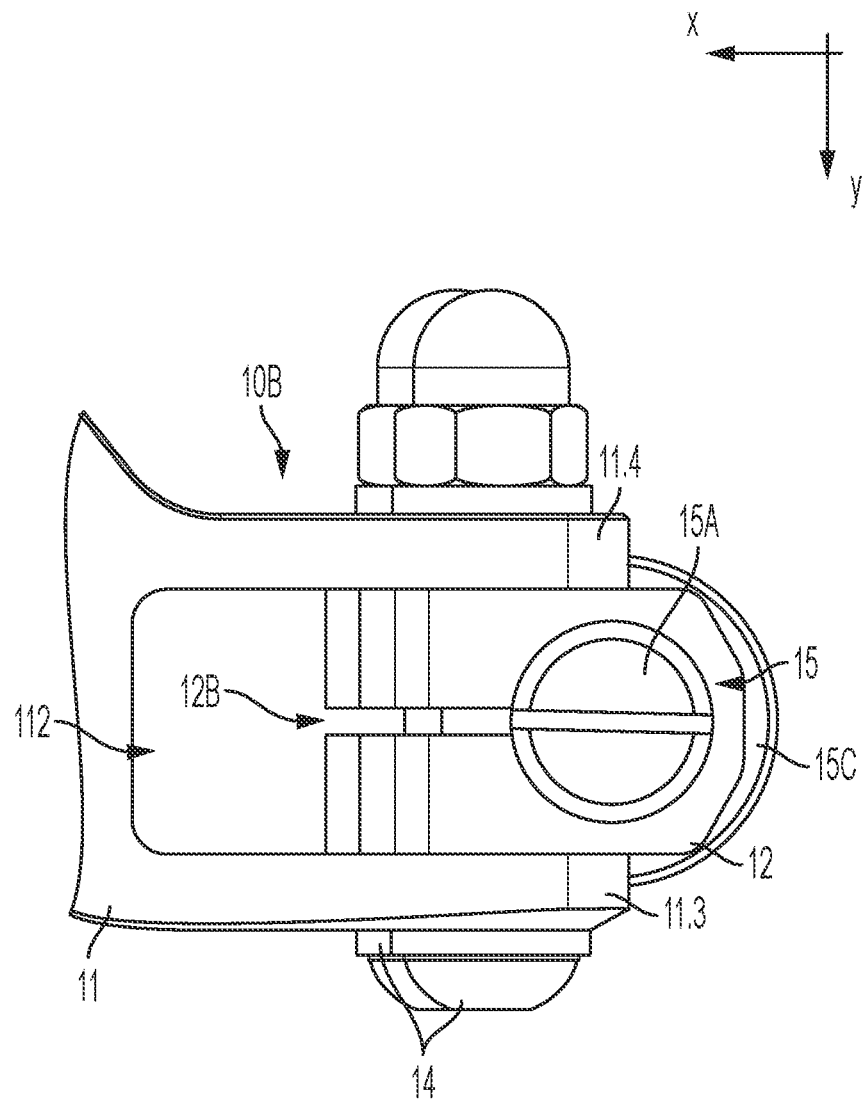
FIG. 5B is a partial top view of the caster wheel support assembly of FIG. 5A showing an upper portion of the swivel member.
Figure 5C:
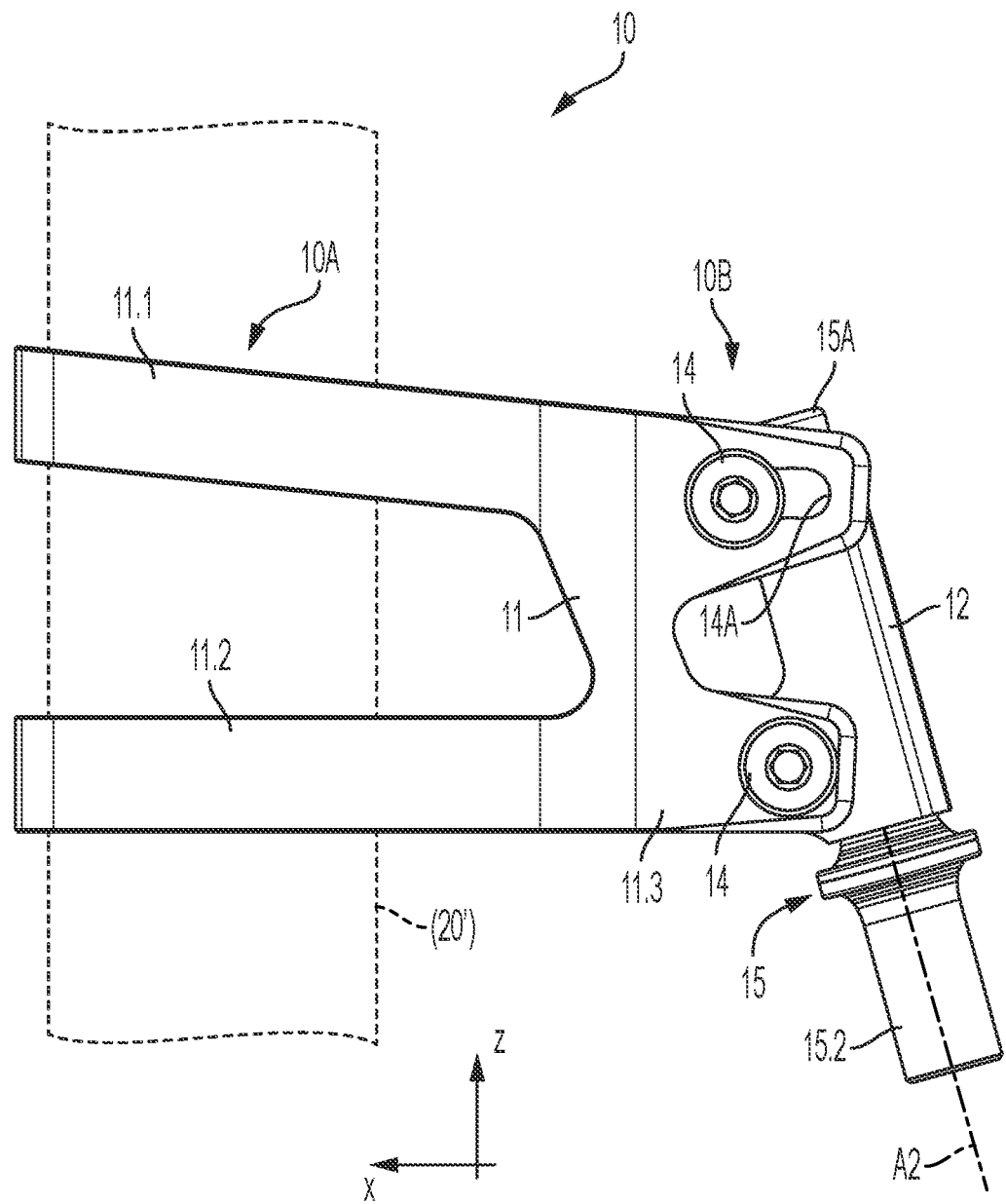
FIG. 5C is another side view of the caster wheel support assembly of FIG. 2A showing the swivel member in a second configuration with respect to the frame member onto which the caster wheel support assembly is mounted.

FIGS. 5A to 5C illustrate adjustment of the caster angle forward or rearward in the driving direction in the context of the aforementioned first embodiment of the invention. As already mentioned above, the holding member 12 is held on the second section 10B of the caster wheel support assembly 10, namely on the second section of the support member 11, by means of the retaining mechanism 11.3/11.4/14, which is designed to selectively allow adjustment of the position of the holding member 12 with respect to the support member 11 to be carried out if need be. This can be achieved by configuring the upper retaining apertures 14A formed in extensions 11.3, 11.4 to exhibit an arc shape and exploiting the lower retaining apertures 14B and associated lower retaining element 14 as a pivot axis about which the holding member 12 can pivot after having loosened the retaining elements 14 as schematically depicted. As a result, an angle of inclination of the swivel member 15 can be adjusted forward or rearward in a driving direction, leading to a corresponding adjustment of the caster angle.

FIGS. 7A to 7F are illustrative of a caster wheel support assembly, designated by reference numeral 10*, in accordance with a second embodiment of the present invention. This caster wheel support assembly 10* likewise has a first section 10A* configured to be securable to a frame member 20* of a wheelchair and a second section 10B* configured to hold a swivel member 15, which swivel member 15 is designed in the same way as the swivel member 15 used in the first embodiment (see again FIG. 4). The caster wheel support assembly 10* also comprises a holding member 12* configured to hold the first portion 15.1 of the swivel member 15, the head portion 15A thereof being visible in FIGS. 7A to 7C (see also FIG. 7D). The second portion 15.2 of the swivel member 15 (not visible in FIGS. 7A and 7B—see FIGS. 7C to 7F) is likewise coupled to a caster wheel 4* by means of a fork element 16*, the upper end of which comes in abutment with the shoulder portion 15C of the swivel member 15.

It may be appreciated that no support member is provided in this second embodiment. Rather, the holding member 12* itself is configured to be securable directly to the frame member 20*. To this end, according to this second embodiment, the holding member 12* exhibits an extension 12.1* configured to be secured to the frame member 20* by means of an adequate securing mechanism comprising in the instant example a (first) retaining element 14* (not shown in FIGS. 7A and 7B) cooperating with a corresponding retaining aperture 14A* provided in an upper portion of the holding member 12* and another retaining element 14 (likewise not shown in FIGS. 7A and 7B) cooperating with a corresponding, arc-shaped retaining aperture 14C* provided in extension 12.1*. The caster wheel support assembly 10* is likewise configured to allow adjustment of an angle of inclination of the swivel member 15 forward or rearward in a driving direction, namely by securing the holding member 12* in such a way that a position with respect to the frame member 20* can be adjusted if need be (see FIGS. 7E and 7F**).

Figure 7A:
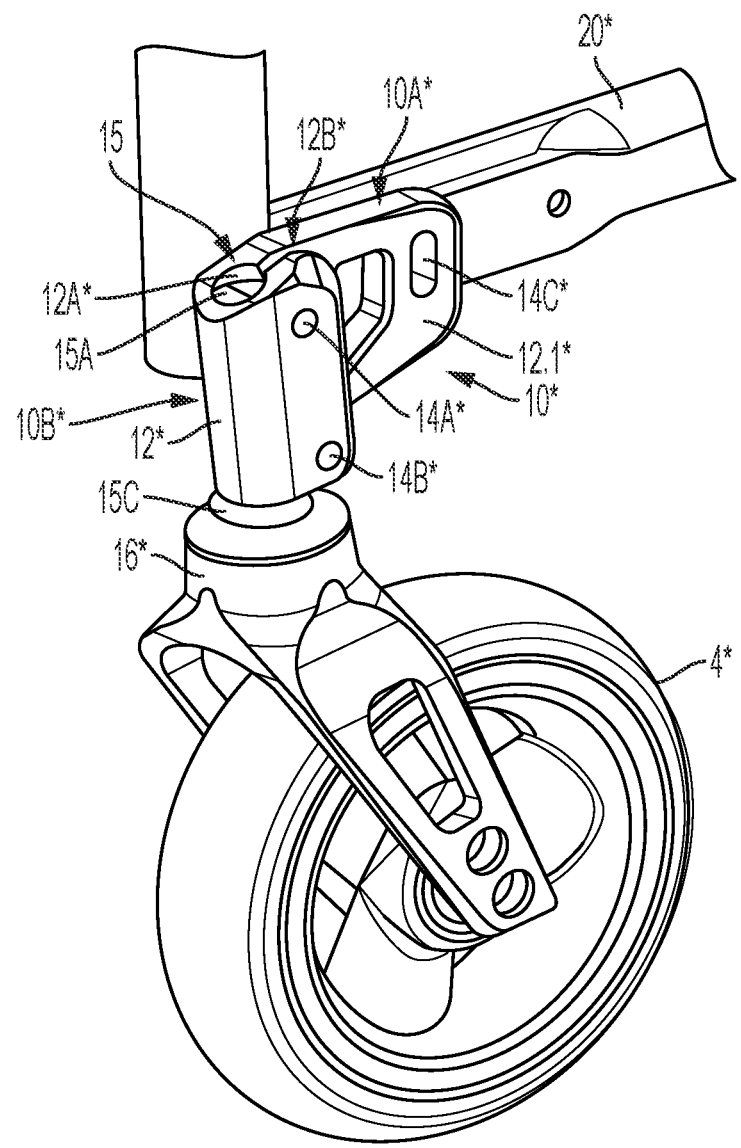
FIGS. 7A and 7B are perspective views taken from different angles of a caster wheel support assembly in accordance with a second embodiment of the present invention.
Figure 7B:
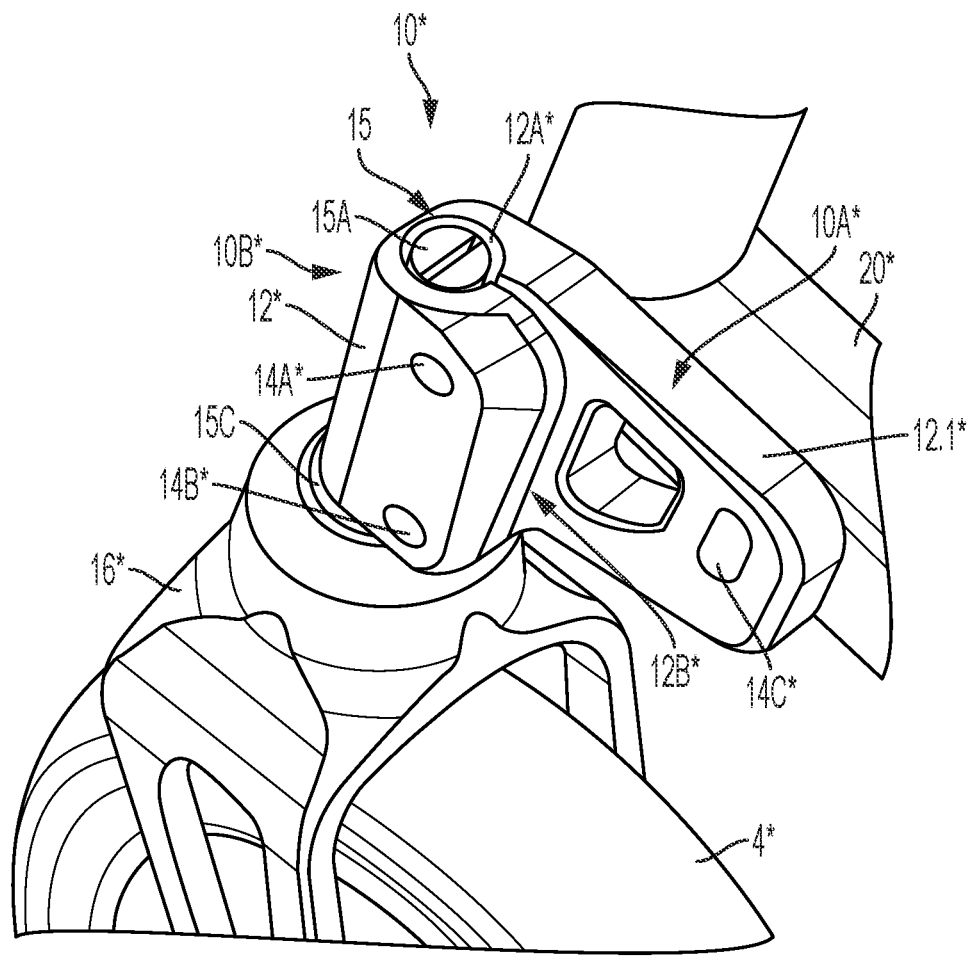
Figure 7C:
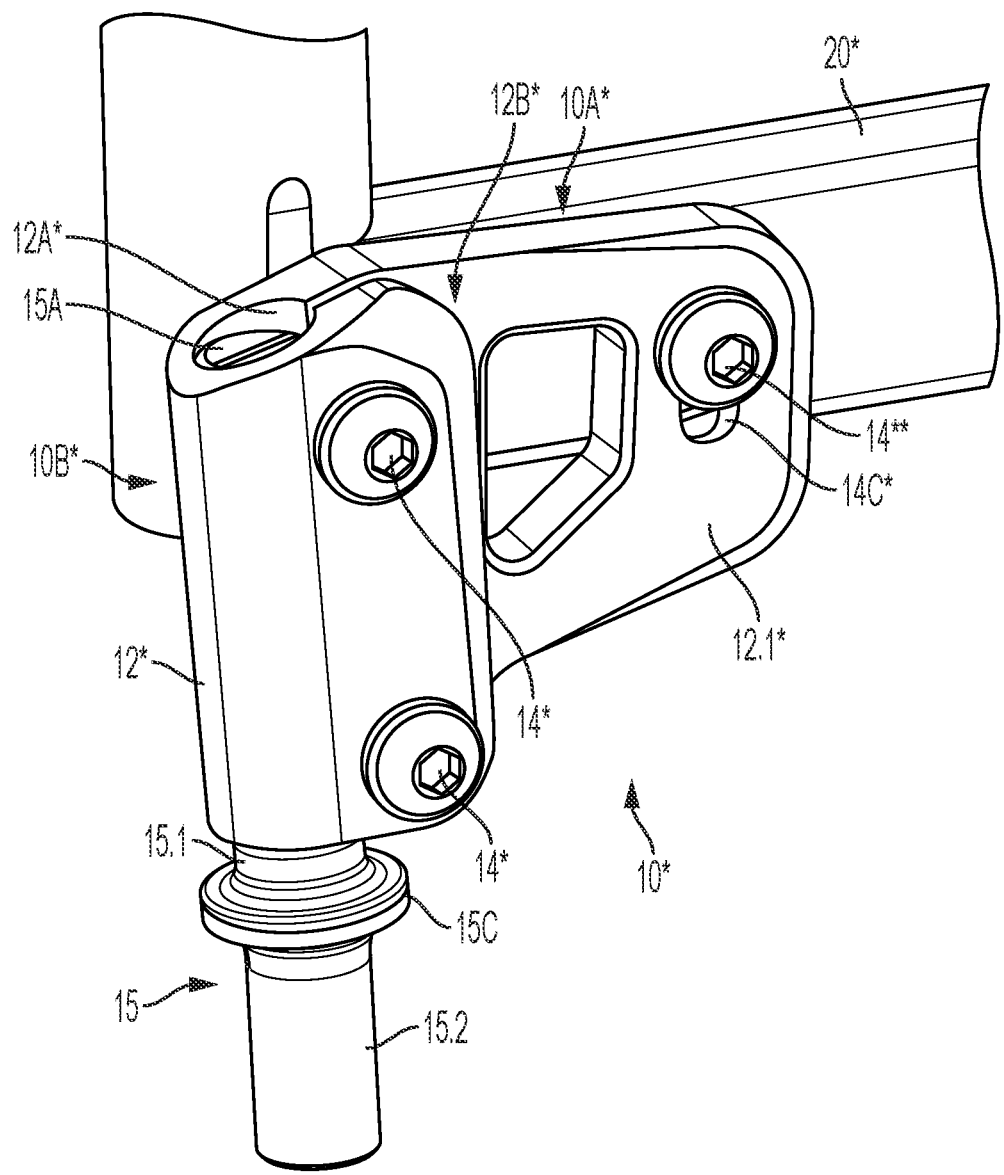
FIG. 7C is another perspective view of the caster wheel support assembly of FIGS. 7A and 7B depicted without the associated caster wheel arrangement.
Figure 7D:
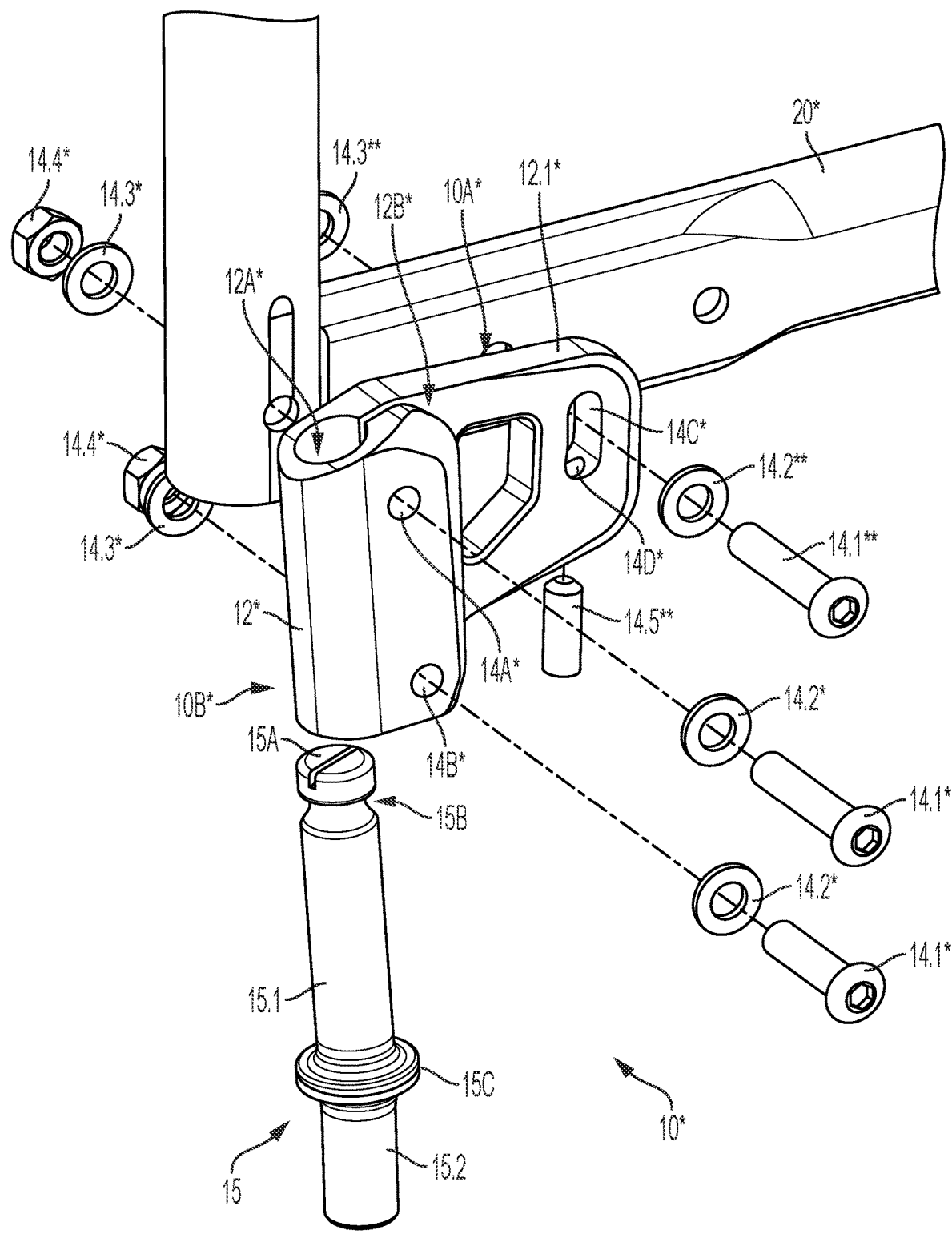
FIG. 7D is an exploded perspective view of the caster wheel support assembly of FIG. 7C.
Figure 7E:
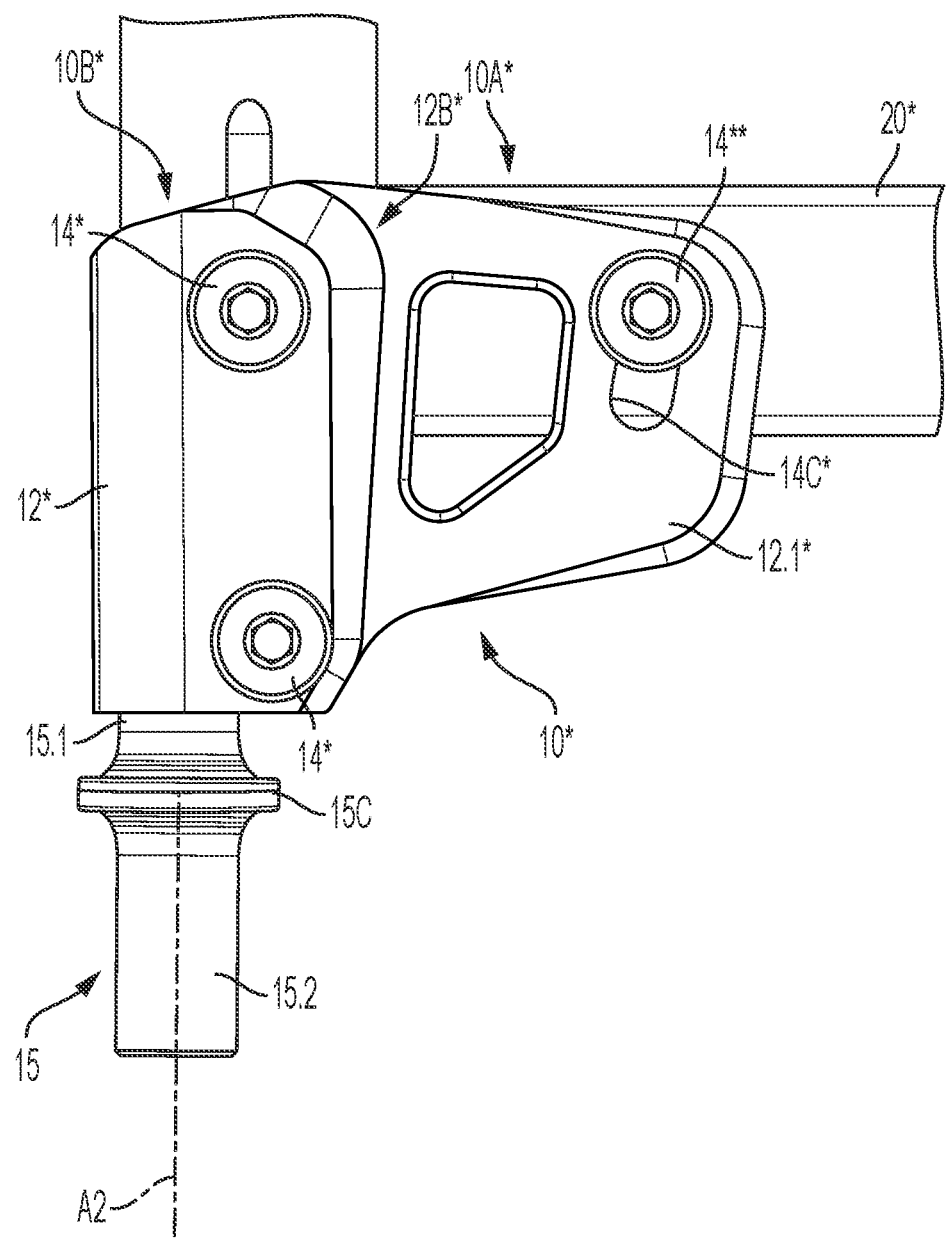
FIG. 7E is a side view of the caster wheel support assembly of FIG. 7C showing the swivel member in a first configuration with respect to the frame member onto which the caster wheel support assembly is mounted.
Figure 7F:
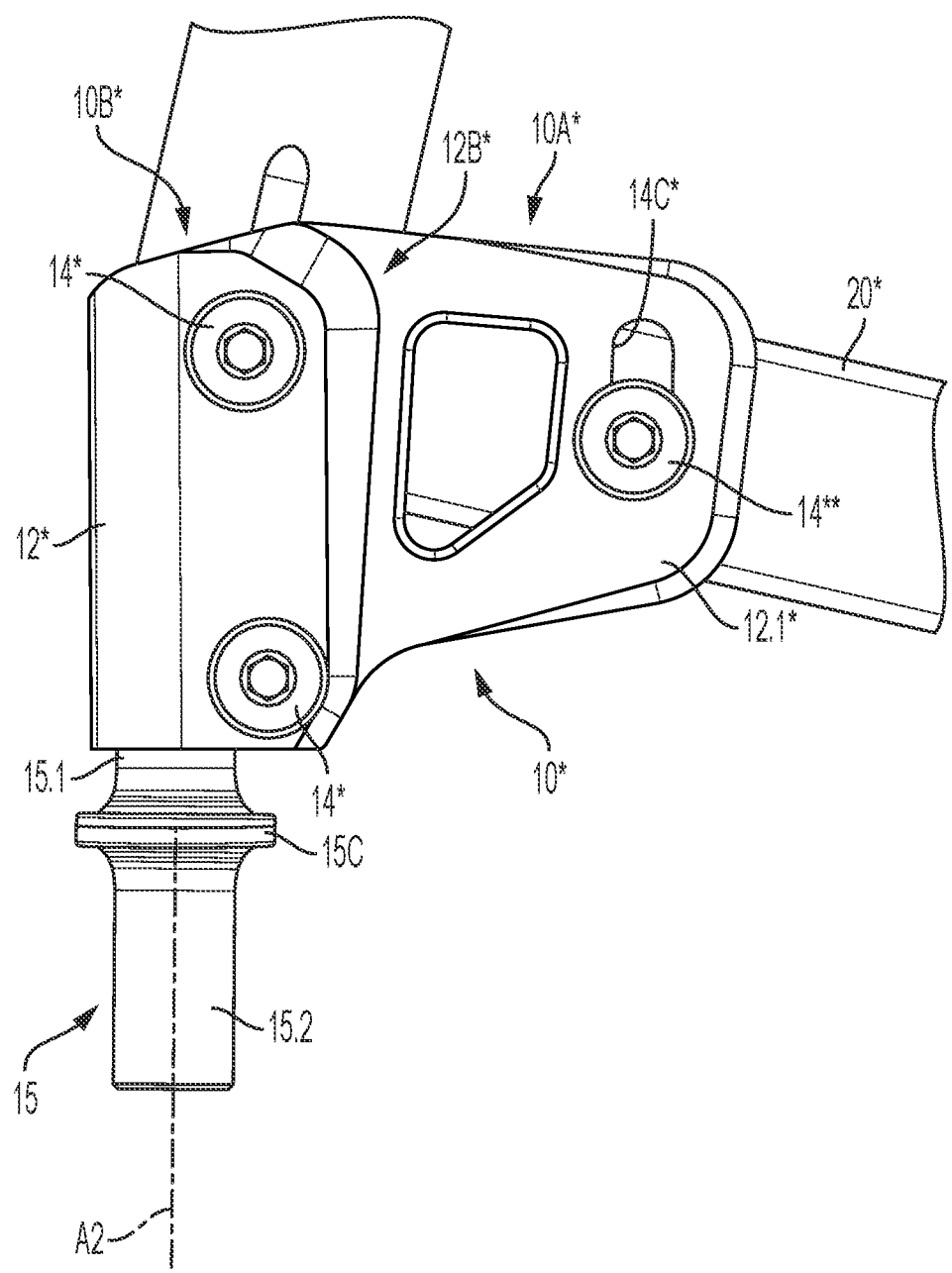
FIG. 7F is another side view of the caster wheel support assembly of FIG. 7C showing the swivel member in a second configuration with respect to the frame member onto which the caster wheel support assembly is mounted.

More precisely, FIGS. 7E and 7F illustrate adjustment of the caster angle forward or rearward in the driving direction in the context of the aforementioned second embodiment of the invention. The holding member 12* is held on the frame member 20* by means the (upper) retaining element 14* and retaining element **14\*\* in such a way as to selectively allow adjustment of the position of the holding member 12\* with respect to the frame member 20\* to be carried out if need be. This is achieved by configuring the retaining aperture 14C\* formed in extension 12.1\* to exhibit an arc shape and exploiting the (upper) retaining aperture 14A\* and associated retaining element 14\* as a pivot axis about which the holding member 12\* can pivot after having loosened the retaining elements 14\*, 14\*\* as schematically depicted. As a result, an angle of inclination of the swivel member 15** can be adjusted forward or rearward in a driving direction, leading to a corresponding adjustment of the caster angle.

In the illustrated example, retaining elements 14\*, **14\*\* each include a bolt 14.1\*, resp. 14.1\*\*, a pair of washers 14.2\*, 14.3\*, resp. 14.2\*\*, 14.3\*\*, and a nut 14.4\* (see FIG. 7D, the nut associated to bolt 14.1\*\* being not visible in this illustration). FIG. 7D further shows the presence of an additional adjustment element 14.5\*\* provided in a corresponding retaining aperture 14D\* that communicates with the retaining aperture 14C\* where the retaining element 14\*\* is provided. This additional adjustment element 14.5\*\* is designed to interact with the retaining element 14\*\*** to define and adjust the desired caster angle.

The holding member 12\* is likewise designed as a collet configured to selectively allow: (i) clamping of the swivel member 15 onto the holding member 12\*, thereby preventing rotation of the swivel member 15 relative to the holding member 12\*; and (ii) release of the swivel member 15 with respect to the holding member 12\*, thereby permitting rotation of the swivel member 15 relative to the holding member 12\*.

This is similarly achieved by designing the holding member 12\* to comprise a guiding aperture 12A\* extending along the first axis A1 and inside which the first portion 15.1 of the swivel member 15 is supported, as well as a longitudinal opening gap 12B\* formed along an axial length of the holding member 12\* to selectively allow clamping or release of the swivel member 15 with respect to the holding member 12\*, for instance by means of a pair of (upper and lower) retaining and clamping elements 14\* cooperating with corresponding retaining apertures 14A\*, 14B\* provided in the holding member 12\*. It shall be understood that the upper retaining and clamping element 14\* likewise cooperates with the grooved section 15B formed in the first portion 15.1 of the swivel member 15 to ensure that the swivel member is held inside the guiding aperture 12A\* as long as the upper retaining and clamping element 14\* remains in place.

Adjustment of the camber is carried out in the same way as in the context of the first embodiment, namely by loosening the retaining and clamping elements 14\*, turning the swivel member 15 by means of a tool, such as a screwdriver, to adjust the camber to the desired setting, and retightening the retaining and clamping elements 14\* after the camber has been adjusted.

Various modifications and/or improvements may be made to the above-described embodiments without departing from the scope of the invention as defined by the annexed claims. For instance, selective clamping or release of the swivel member with respect to the holding member could be carried out in different ways than by tightening or loosening bolts. Any suitable releasable clamping mechanism could in essence be used.

In addition, while the swivel member used in the context of the embodiments described above exhibits a substantially cylindrical first portion and is rotatable over 360°, one could alternatively design the first portion of the swivel member to permit rotation only within a defined angular sector. As a matter of fact, it is sufficient for the camber adjustment to be adjustable over the complete range of e.g. +/−2° to design the swivel member so as to be rotatable over an angular sector of 180° or more.

Furthermore, although the embodiments disclosed herein show wheelchairs equipped with a pair of front caster wheels, the invention is generally applicable to any wheelchair comprising one or more caster wheel support assemblies provided at the front and/or rear end of the wheelchair.

The invention claimed is:

1. A caster wheel support assembly for a wheelchair, the caster wheel support assembly having a first section configured to be securable to a frame member of the wheelchair and a second section configured to hold a swivel member coupled to a caster wheel,
   wherein the caster wheel support assembly comprises a holding member designed as a collet configured to hold a first portion of the swivel member, wherein the first portion extends along a first axis,
   wherein a second portion of the swivel member, which is coupled to the caster wheel, extends away from the first portion along a second axis, wherein the second axis forms an angle relative to the first axis,
   wherein the holding member and swivel member are configured such that the first portion of the swivel member is supported by the holding member to selectively allow rotation of the swivel member relative to the holding member about the first axis and thereby cause adjustment of a camber of the caster wheel,
   and wherein the collet is configured to selectively allow:
   clamping of the swivel member onto the holding member, thereby preventing rotation of the swivel member relative to the holding member; and
   release of the swivel member with respect to the holding member, thereby permitting rotation of the swivel member relative to the holding member.

2. The caster wheel support assembly according to claim 1, wherein the holding member comprises a longitudinal opening gap formed along an axial length of the holding member, which longitudinal opening gap is designed to selectively allow clamping or release of the swivel member with respect to the holding member.

3. The caster wheel support assembly according to claim 1, wherein the camber of the caster wheel is adjustable in a continuous, stepless manner as a result of rotation of the swivel member about the first axis.

4. The caster wheel support assembly according to claim 1, wherein the holding member comprises a guiding aperture extending along the first axis and inside which the first portion of the swivel member is supported.

5. The caster wheel support assembly according to claim 1, wherein the caster wheel support assembly is configured to allow adjustment of an angle of inclination of the swivel member forward or rearward in a driving direction.

6. The caster wheel support assembly according to claim 1, wherein the first and second sections of the caster wheel support assembly are part of a support member of the caster wheel support assembly, the holding member being secured to the second section of the support member.

7. A wheelchair comprising at least one caster wheel support assembly according to claim 6 secured to a frame member of the wheelchair, wherein the frame member exhibits a non-circular cross-section where the caster wheel support assembly is secured to the frame member, and wherein the first section of the support member is provided with at least one mounting aperture the shape of which substantially matches the non-circular cross-section of the frame member, preventing any rotation of the support member with respect to the frame member.

8. The wheelchair according to claim 7, wherein the frame member and the support member of the caster wheel support assembly are configured such that the support member is slidably adjustable along the frame member.

9. The wheelchair according to claim 7, wherein the frame member is a hydroformed part.

10. The wheelchair according to claim 9, wherein the frame member is made of aluminum.

11. The caster wheel support assembly according to claim 1, wherein the holding member itself is configured to be securable directly to the frame member.

12. A wheelchair comprising at least one caster wheel support assembly according to claim 1 secured to a frame member of the wheelchair.

13. The wheelchair according to claim 12, wherein the frame member is a hydroformed part.

14. The wheelchair according to claim 13, wherein the frame member is made of aluminum.

15. A caster wheel support assembly for a wheelchair, the caster wheel support assembly having a first section configured to be securable to a frame member of the wheelchair and a second section configured to hold a swivel member coupled to a caster wheel,
wherein the caster wheel support assembly comprises a holding member designed as a collet configured to hold a first portion of the swivel member, wherein the first portion extends along a first axis,
wherein a second portion of the swivel member, which is coupled to the caster wheel, extends away from the first portion along a second axis, wherein the second axis forms an angle relative to the first axis,
wherein the holding member and swivel member are configured such that the first portion of the swivel member is supported by the holding member to selectively allow rotation of the swivel member relative to the holding member about the first axis and thereby cause adjustment of a camber of the caster wheel,
wherein the collet is configured to selectively allow:
clamping of the swivel member onto the holding member, thereby preventing rotation of the swivel member relative to the holding member; and
release of the swivel member with respect to the holding member, thereby permitting rotation of the swivel member relative to the holding member,
and wherein the first portion of the swivel member comprises a head portion that is designed to allow manual rotation of the swivel member about the first axis by means of a tool.

16. A caster wheel support assembly for a wheelchair, the caster wheel support assembly having a first section configured to be securable to a frame member of the wheelchair and a second section configured to hold a swivel member coupled to a caster wheel,
wherein the caster wheel support assembly comprises a holding member designed as a collet configured to hold a first portion of the swivel member, wherein the first portion extends along a first axis,
wherein a second portion of the swivel member, which is coupled to the caster wheel, extends away from the first portion along a second axis, wherein the second axis forms an angle relative to the first axis,
wherein the holding member and swivel member are configured such that the first portion of the swivel member is supported by the holding member to selectively allow rotation of the swivel member relative to the holding member about the first axis and thereby cause adjustment of a camber of the caster wheel,
wherein the collet is configured to selectively allow:
clamping of the swivel member onto the holding member, thereby preventing rotation of the swivel member relative to the holding member; and
release of the swivel member with respect to the holding member, thereby permitting rotation of the swivel member relative to the holding member,
wherein the first and second sections of the caster wheel support assembly are part of a support member of the caster wheel support assembly, the holding member being secured to the second section of the support member,
and wherein the first section of the support member comprises first and second arms each configured to be securable to the frame member.

17. A caster wheel support assembly for a wheelchair, the caster wheel support assembly having a first section configured to be securable to a frame member of the wheelchair and a second section configured to hold a swivel member coupled to a caster wheel,
wherein the caster wheel support assembly comprises a holding member designed as a collet configured to hold a first portion of the swivel member, wherein the first portion extends along a first axis,
wherein a second portion of the swivel member, which is coupled to the caster wheel, extends away from the first portion along a second axis, wherein the second axis forms an angle relative to the first axis,
wherein the holding member and swivel member are configured such that the first portion of the swivel member is supported by the holding member to selectively allow rotation of the swivel member relative to the holding member about the first axis and thereby cause adjustment of a camber of the caster wheel,
wherein the collet is configured to selectively allow:
clamping of the swivel member onto the holding member, thereby preventing rotation of the swivel member relative to the holding member; and
release of the swivel member with respect to the holding member, thereby permitting rotation of the swivel member relative to the holding member,
and wherein the angle formed between the first and second axes does not exceed 5°.

18. The caster wheel support assembly according to claim 17, wherein the angle formed between the first and second axes is of 2°.

19. A caster wheel support assembly for a wheelchair, the caster wheel support assembly having a first section configured to be securable to a frame member of the wheelchair and a second section configured to hold a swivel member coupled to a caster wheel,
wherein the caster wheel support assembly comprises a holding member designed as a collet configured to hold a first portion of the swivel member, wherein the first portion extends along a first axis,
wherein a second portion of the swivel member, which is coupled to the caster wheel, extends away from the first portion along a second axis, wherein the second axis forms an angle relative to the first axis,
wherein the holding member and swivel member are configured such that the first portion of the swivel member is supported by the holding member to selectively allow rotation of the swivel member relative to the holding member about the first axis and thereby cause adjustment of a camber of the caster wheel,
wherein the collet is configured to selectively allow:
   clamping of the swivel member onto the holding member, thereby preventing rotation of the swivel member relative to the holding member; and
   release of the swivel member with respect to the holding member, thereby permitting rotation of the swivel member relative to the holding member,
wherein the holding member comprises a guiding aperture extending along the first axis and inside which the first portion of the swivel member is supported,
wherein the first and second portions of the swivel member are substantially cylindrical portions coaxial to the first and second axes, respectively,
wherein the first portion of the swivel member exhibits a grooved section designed to retain the swivel member inside the guiding aperture,
and wherein the caster wheel support assembly further comprises a retaining element secured to the holding member, which retaining element cooperates with the grooved section on the first portion of the swivel member.

20. The caster wheel support assembly according to claim 19, wherein the retaining element also acts as clamping element to selectively clamp the swivel member onto the holding member and prevent rotation of the swivel member relative to the holding member.

* * * * *